(12) United States Patent
Sidki et al.

(10) Patent No.: US 10,106,238 B2
(45) Date of Patent: *Oct. 23, 2018

(54) SYSTEM AND METHOD FOR FUSION OF SENSOR DATA TO SUPPORT AUTONOMOUS MARITIME VESSELS

(71) Applicant: Leidos, Inc., Reston, VA (US)

(72) Inventors: Nahid Sidki, Great Falls, VA (US); Weicheng Shen, Vienna, VA (US); Suk Lee, Alexandria, VA (US); Andrew Genduso, Fairfax, VA (US)

(73) Assignee: Leidos, Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/916,839

(22) Filed: Mar. 9, 2018

(65) Prior Publication Data

US 2018/0215457 A1 Aug. 2, 2018

Related U.S. Application Data

(63) Continuation of application No. 14/968,161, filed on Dec. 14, 2015, now Pat. No. 9,963,215.

(60) Provisional application No. 62/091,819, filed on Dec. 15, 2014.

(51) Int. Cl.
| | |
|---|---|
| *B63H 25/04* | (2006.01) |
| *G05D 1/00* | (2006.01) |
| *G05D 1/02* | (2006.01) |
| *B63B 35/00* | (2006.01) |
| *G08G 3/02* | (2006.01) |

(52) U.S. Cl.
CPC .............. *B63H 25/04* (2013.01); *B63B 35/00* (2013.01); *G05D 1/0088* (2013.01); *G05D 1/0206* (2013.01); *G08G 3/02* (2013.01); *B63B 2035/007* (2013.01)

(58) Field of Classification Search
CPC .... B63H 25/04; G05D 1/0088; G05D 1/0206; G08G 3/02; B63B 35/00; B63B 2035/007
See application file for complete search history.

(56) References Cited

U.S. PATENT DOCUMENTS

| 8,849,483 B2 | 9/2014 | Kuwata et al. ................. 701/21 |
| 2004/0065247 A1 | 4/2004 | Horton .......................... 114/322 |
| 2014/0191893 A1 | 7/2014 | Fox et al. ........................ 342/27 |

OTHER PUBLICATIONS

Michaelis, et al., "Case Study: Limitations of Parameter Estimation for Non-Cooperative Multistatic Active Sonar by Association Ambiguities," 2014 Sensor Data Fusion: Trends, Solutions, Applications, IEEE, pp. 1-6, 2014.

Braca, et al., "Cognitive Multistatic AUV Networks," 17th International Conference on Information Fusion (FUSION), IEEE, pp. 1-7, 2014.

(Continued)

*Primary Examiner* — Russell Frejd
(74) *Attorney, Agent, or Firm* — Dawn Marie Bey; Bey & Cotropia PLLC

(57) ABSTRACT

A system of modular components can be used with existing sensor suites to fuse data and determine the operating environment (surface contacts/tracks) for an autonomous marine vehicle and feed an autonomy decision engine to improve the vessel arbitration process in deciding which way to turn, how fast to go, obstacle avoidance, and mission monitoring. The system includes the ability to obey the set of navigation rules published by the International Maritime Organization, generally referred to as COLREGS (collision regulations).

12 Claims, 27 Drawing Sheets

Autonomy Functional Capabilities

(56) References Cited

OTHER PUBLICATIONS

Goldhahn, et al., "Environmentally Sensitive Particle Filter Tracking in Multistatic AUV Networks with Port-Starboard Ambiguity," 2014 IEEE International Conference on Acoustics, Speech, and Signal Processing, pp. 1458-1462, 2014.

Donald B. Reid, "An Algorithm for Tracking Multiple Targets," IEEE Transactions on Automatic Control, 24(6):843-854, Dec. 1979.

L. J. Cox and S. L. Hingorani, "An Efficient Implementation of Reid's Multiple Hypothesis Tracking Algorithm and its Evaluation for the Purpose of Visual Tracking," IEEE Transactions on Pattern Analysis and Machine Intelligence, 18(2): 138-150, Feb. 1996.

K. G. Murty, "An Algorithm for Ranking All the Assignments in Order of Increasing Cost," Operations Research 16 (168), pp. 682, 687.

L. J. Cox and M. L. Miller, "On Finding Ranked Assignments With Application to Multi-Target Tracking and Motion Correspondence," IEEE Trans. on Aerospace and Electronic Systems, 32(1): 486-489, 1995.

R. Jonker and A. Volgenant, "A Shortest Augmenting Path Algorithm for Dense and Sparse Linear Assignment Problems," Computing 38, 325-340 (1987).

Figure 1: Autonomy Functional Capabilities

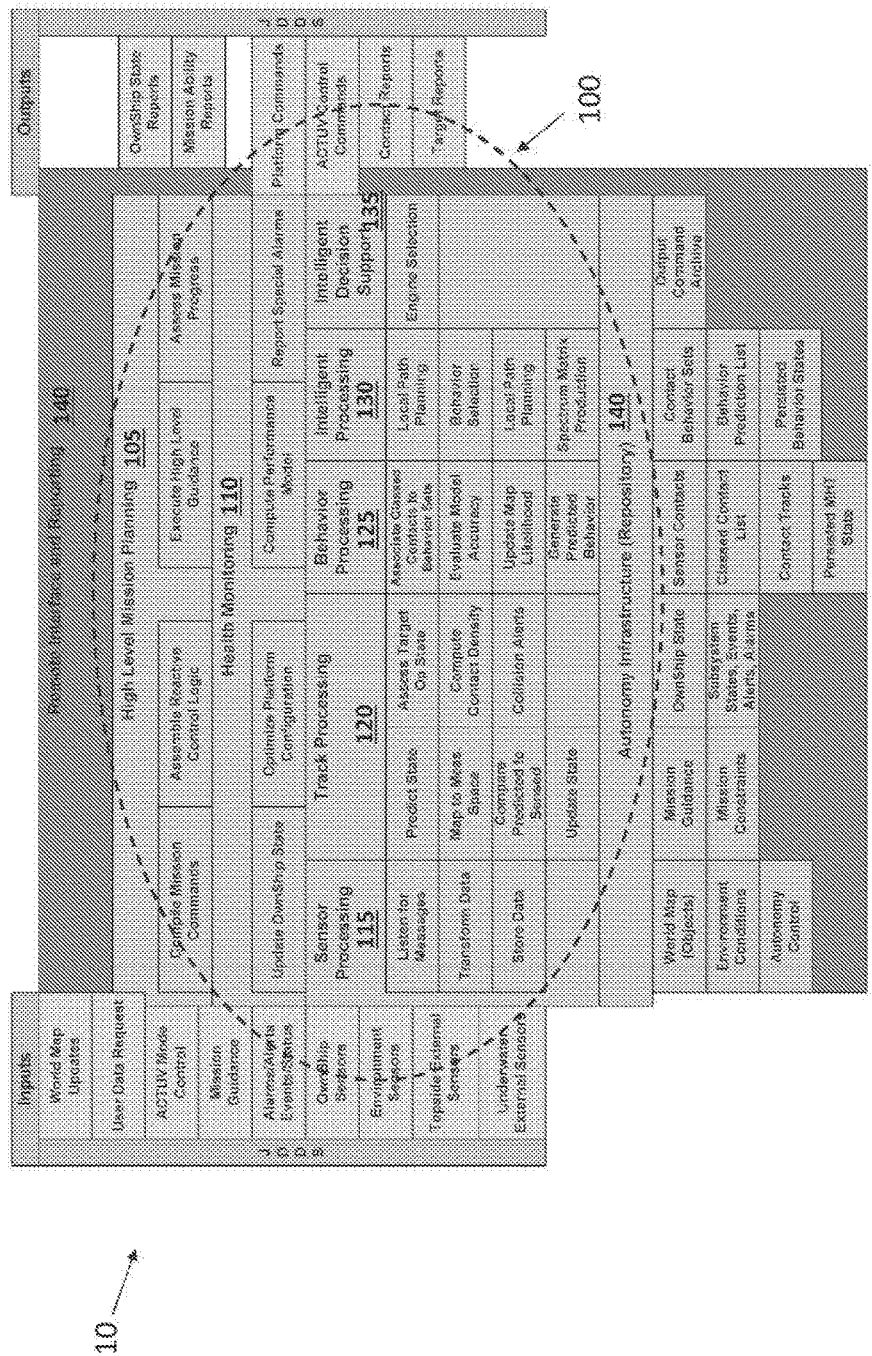
Figure 2: Autonomy System Context Diagram

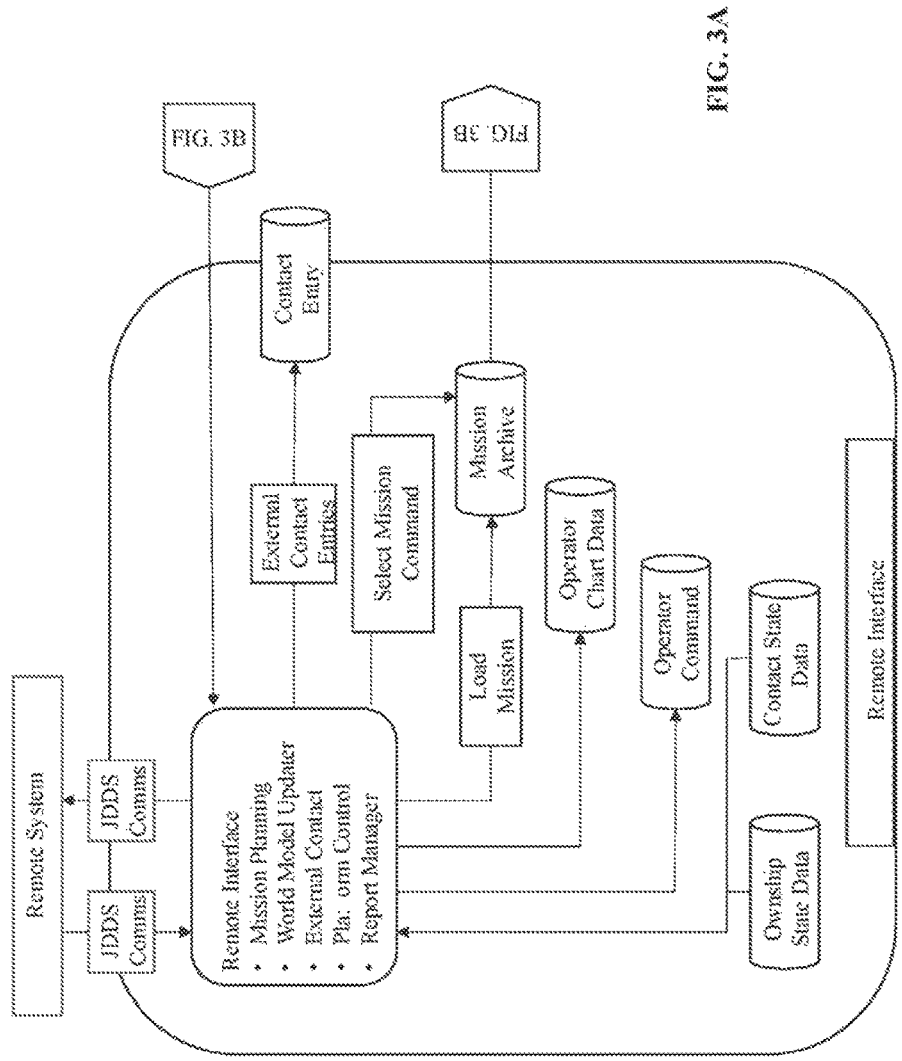

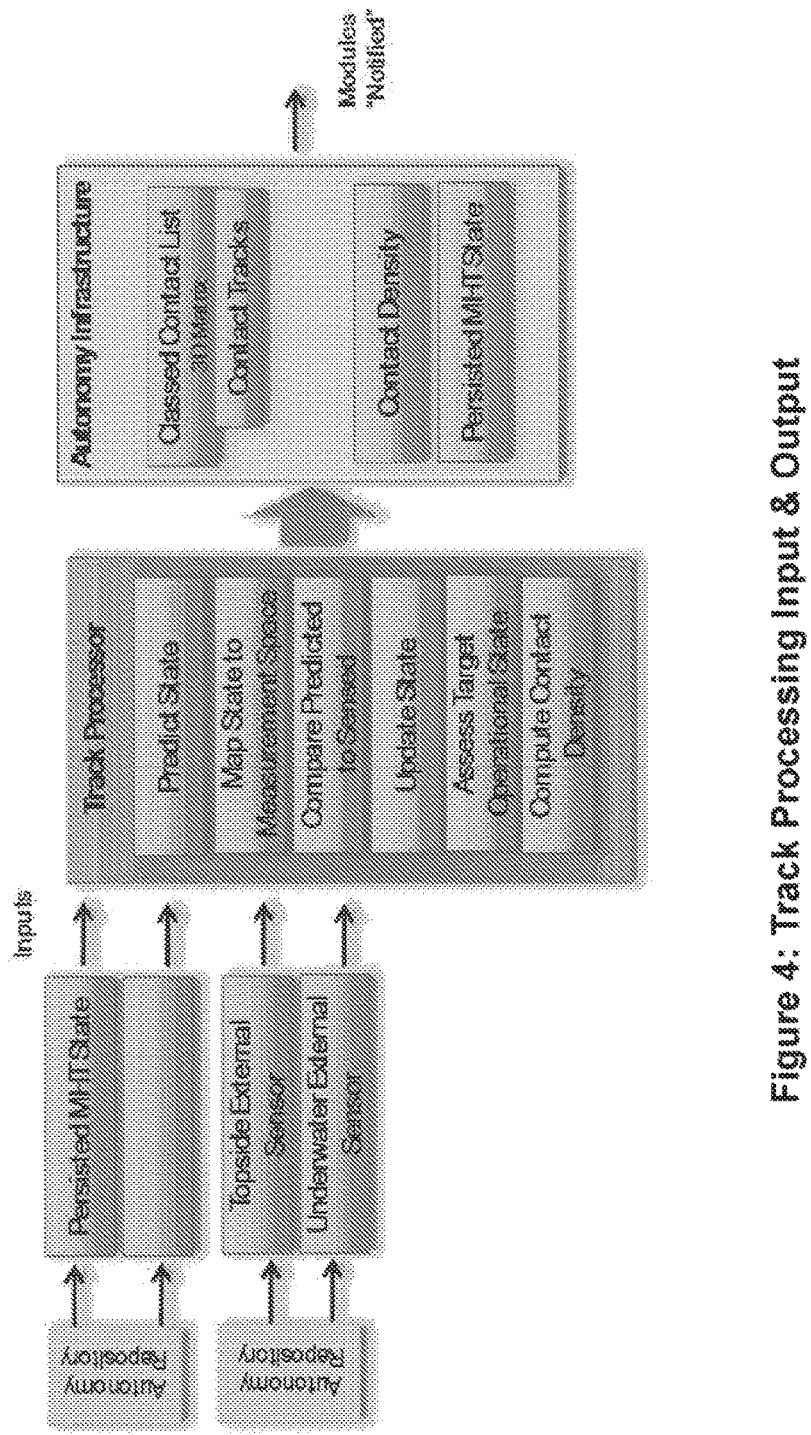
Figure 4: Track Processing Input & Output

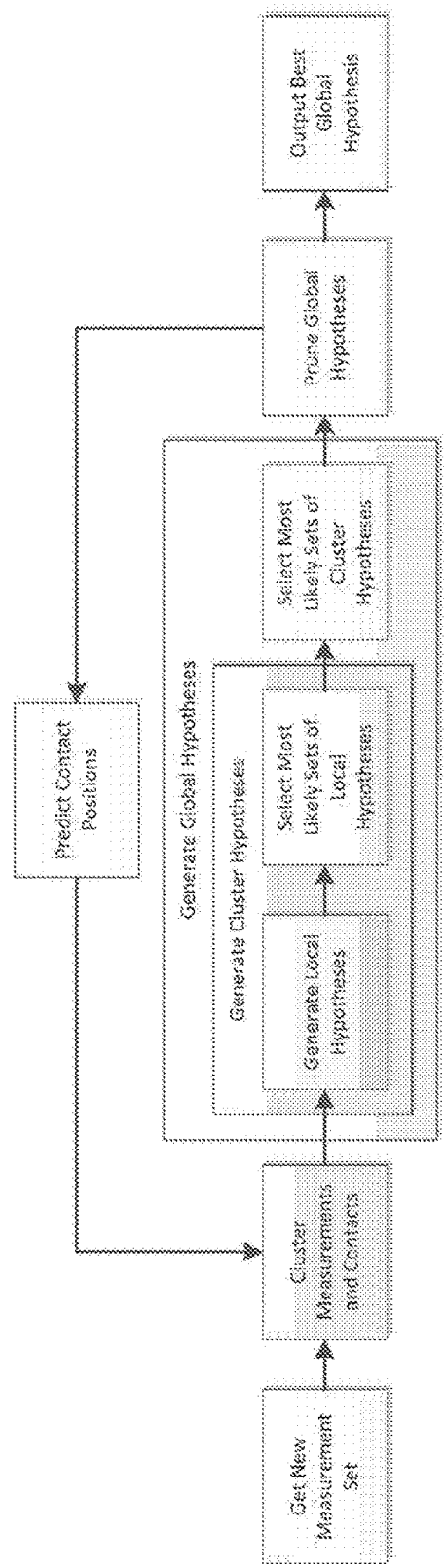
Figure 5 MHT Algorithm Overview

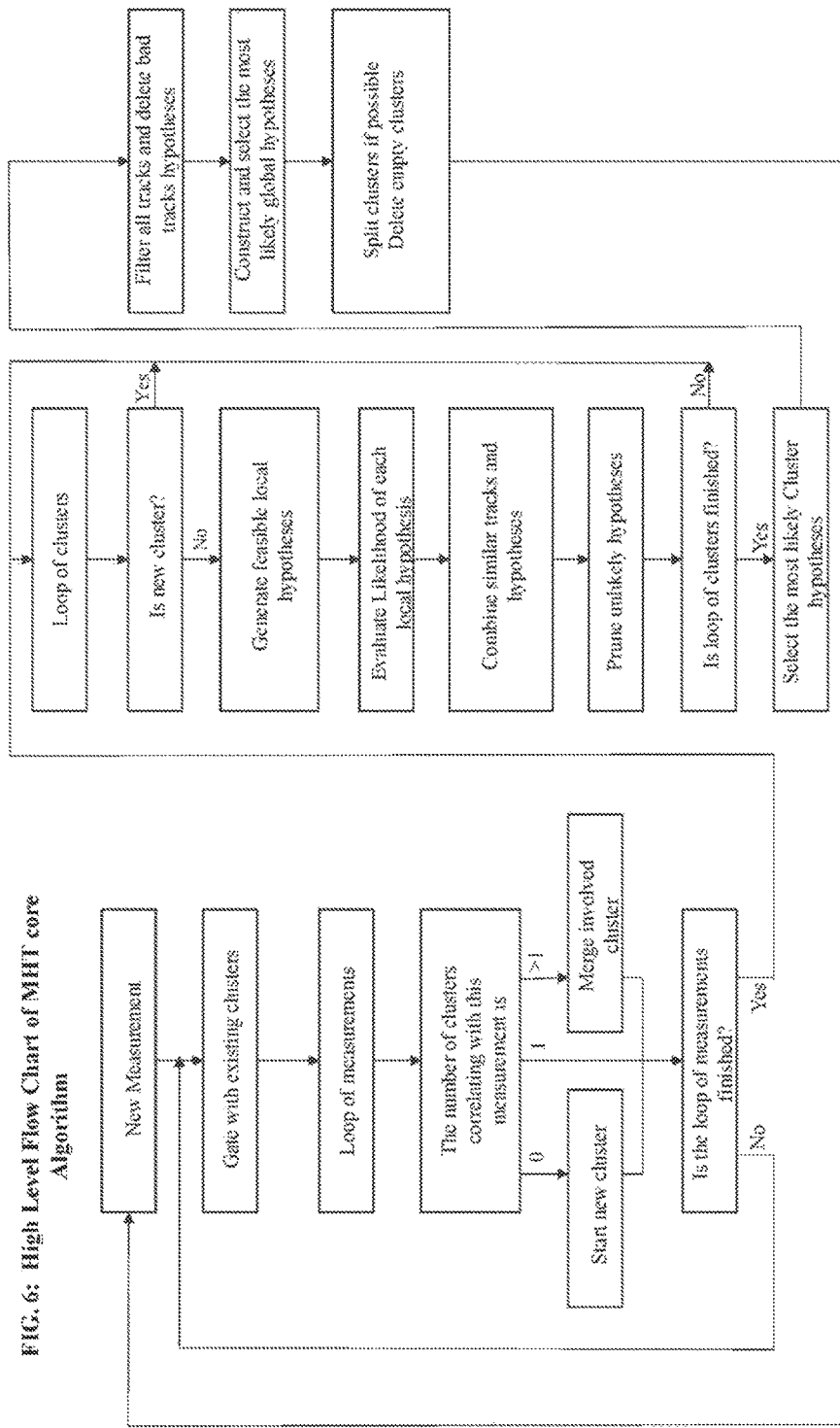
FIG. 6: High Level Flow Chart of MHT core Algorithm

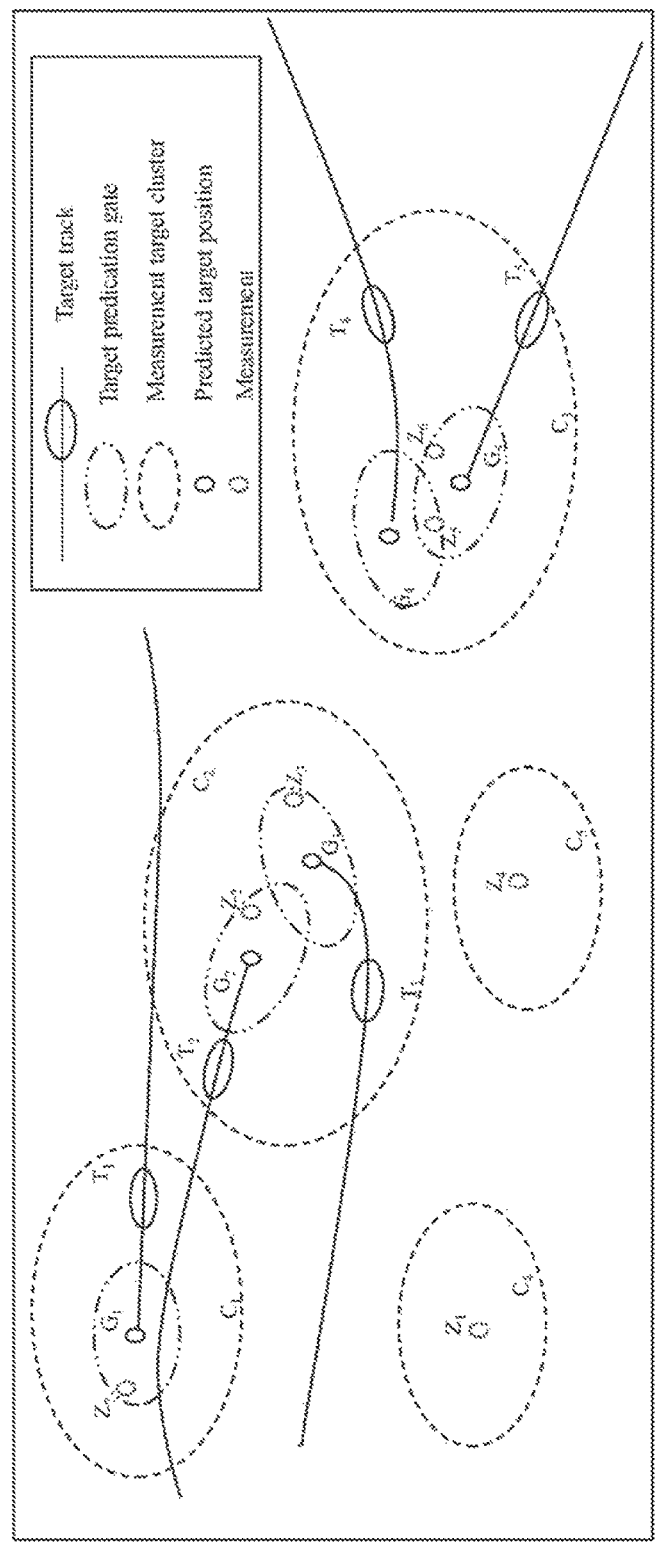
FIG. 7: Example Clustering Result

SYSTEM AND METHOD FOR FUSION OF SENSOR DATA TO SUPPORT AUTONOMOUS MARITIME VESSELS

CROSS REFERENCE TO RELATED APPLICATIONS

The present application is a continuation of U.S. application Ser. No. 14/968,161 filed Dec. 14, 2015, titled "System and Method For Fusion of Sensor Data To Support Autonomous Maritime Vessels," which claims the benefit of priority to similarly titled U.S. provisional patent application No. 62/091,819 filed Dec. 15, 2014, all of which are incorporated herein by reference in their entireties.

Aspects of the present embodiment were conceived and or reduced to practice in performance of a contract with the Defense Advanced Research Projects Agency (DARPA). Accordingly, the United States government may have rights in certain embodiments.

BACKGROUND

Field of the Invention

The present embodiments support maritime autonomous solutions. More particularly, the present embodiments are directed to components for use with Anti-Submarine Warfare (ASW) Continuous Trail Unmanned Vessels (ACTUV) which provide improved input data to an autonomy decision engine.

Description of Related Art

The increasing number of diesel-electric submarines presents a challenge to the United States naval forces. Accordingly, there is a critical need to offset the risk posed by such small and quiet subs. In order to do so, the ability to locate and track the subs is of paramount importance. To meet this need, the Defense Advanced Research Projects Agency (DARPA's) is supporting the ACTUV project to develop an unmanned surface vessel that will be able to locate and track submarines deep under the water, at levels of precision, persistence and flexibility beyond those capabilities available by manned surface ships operating anti-submarine warfare. Such capabilities will become particularly important as the US Naval missions are focused toward littorals in the Hormuz Straits, the Persian Gulf, South China Sea, East Africa, the Mediterranean and the Caribbean Sea.

The vessel is designed to operate fully autonomously, thus providing a forward deployed and rapid-responsive asset in the global maritime surveillance network. With the planned implementation, the ACTUV is intended to be capable of rapid response and autonomous travel to arrive as soon as possible in the area of operation.

In order to achieve the advanced level of autonomy required to enable independently deploying systems to operate on missions spanning thousands of miles in range and months of endurance, under a sparse remote supervisory control model, the ACTUV autonomous operations must comply with maritime laws and conventions for safe navigation. More particularly, the system and method must be able to autonomously collect and process data to guide the vessel arbitration process in deciding which way to turn, how fast to go, obstacle avoidance, and mission monitoring.

SUMMARY OF THE EMBODIMENTS

In a first embodiment, an autonomous maritime vehicle for use in identifying and tracking maritime vessel contacts is described. The vehicle includes: data fusion architecture implemented on one or more processors for receiving multiple data sets from multiple sensors associated with the autonomous maritime vehicle and fusing the data to determine a state of the current operating environment of the autonomous maritime vehicle, wherein a state of the current operating environment includes identification of one or more maritime vessel contacts and one or more tracks of thereof within the operating environment; and an autonomy decision engine for receiving the fused data from the data fusion architecture and using the fused data in deciding a next action for the autonomous maritime vehicle, wherein the next action is selected from the group consisting of at least one of turning, speed changed, and obstacle avoidance.

In a second embodiment, an autonomous navigation system for directing an autonomous maritime vehicle is described. The system includes: a sensor processing module; and a track processing module; wherein the sensor processing module receives data inputs from multiple sensors, the data inputs providing information relevant to identification of other maritime vessels within an operational range of the autonomous maritime vehicle and useful for determining a predicted track of each of the other identified maritime vessels by a Multi-Hypothesis Tracking (MHT) algorithm of the track processing module.

In a third embodiment, a process for directing an autonomous maritime vehicle is described. The process including: receiving data inputs from multiple sensors on the autonomous maritime vehicle at a sensor processing module, the data inputs providing information relevant to identification of other maritime vessels within an operational range of the autonomous maritime vehicle; determining, by a track processing module, a predicted track of each of the other maritime vessels identified in the operational range of the autonomous maritime vehicle; and receiving, by autonomy decision engine, the predicted track data and deciding a next action for the autonomous maritime vehicle, wherein the next action is selected from the group consisting of at least one of turning, speed changed, and obstacle avoidance.

BRIEF DESCRIPTION OF THE FIGURES

The following figures illustrate various features of the present embodiments.

FIG. 1 highlights the autonomy functional capabilities of an Anti-Submarine Warfare (ASW) Continuous Trail Unmanned Vessels (ACTUV) in accordance with one or more embodiments herein;

FIG. 2 provides an autonomy system context diagram for an Anti-Submarine Warfare (ASW) Continuous Trail Unmanned Vessels (ACTUV) in accordance with one or more embodiments herein;

FIGS. 3a-3d provide views of the autonomy software architecture supporting operation of an Anti-Submarine Warfare (ASW) Continuous Trail Unmanned Vessels (ACTUV) in accordance with one or more embodiments herein;

FIG. 4 is a schematic of the track processing input and outputs supporting operation of an Anti-Submarine Warfare (ASW) Continuous Trail Unmanned Vessels (ACTUV) in accordance with one or more embodiments herein;

FIG. 5 is an overview of the Multi-Hypothesis Tracking (MHT) algorithm supporting operation of an Anti-Submarine Warfare (ASW) Continuous Trail Unmanned Vessels (ACTUV) in accordance with one or more embodiments herein;

FIG. 6 is a flow chart of the Multi-Hypothesis Tracking (MHT) algorithm supporting operation of an Anti-Submarine Warfare (ASW) Continuous Trail Unmanned Vessels (ACTUV) in accordance with one or more embodiments herein;

FIG. 7 is an exemplary clustering result from implantation of the Multi-Hypothesis Tracking (MHT) algorithm process of FIG. 6 supporting operation of an Anti-Submarine Warfare (ASW) Continuous Trail Unmanned Vessels (ACTUV) in accordance with one or more embodiments herein;

DETAILED DESCRIPTION

Figure 3B:
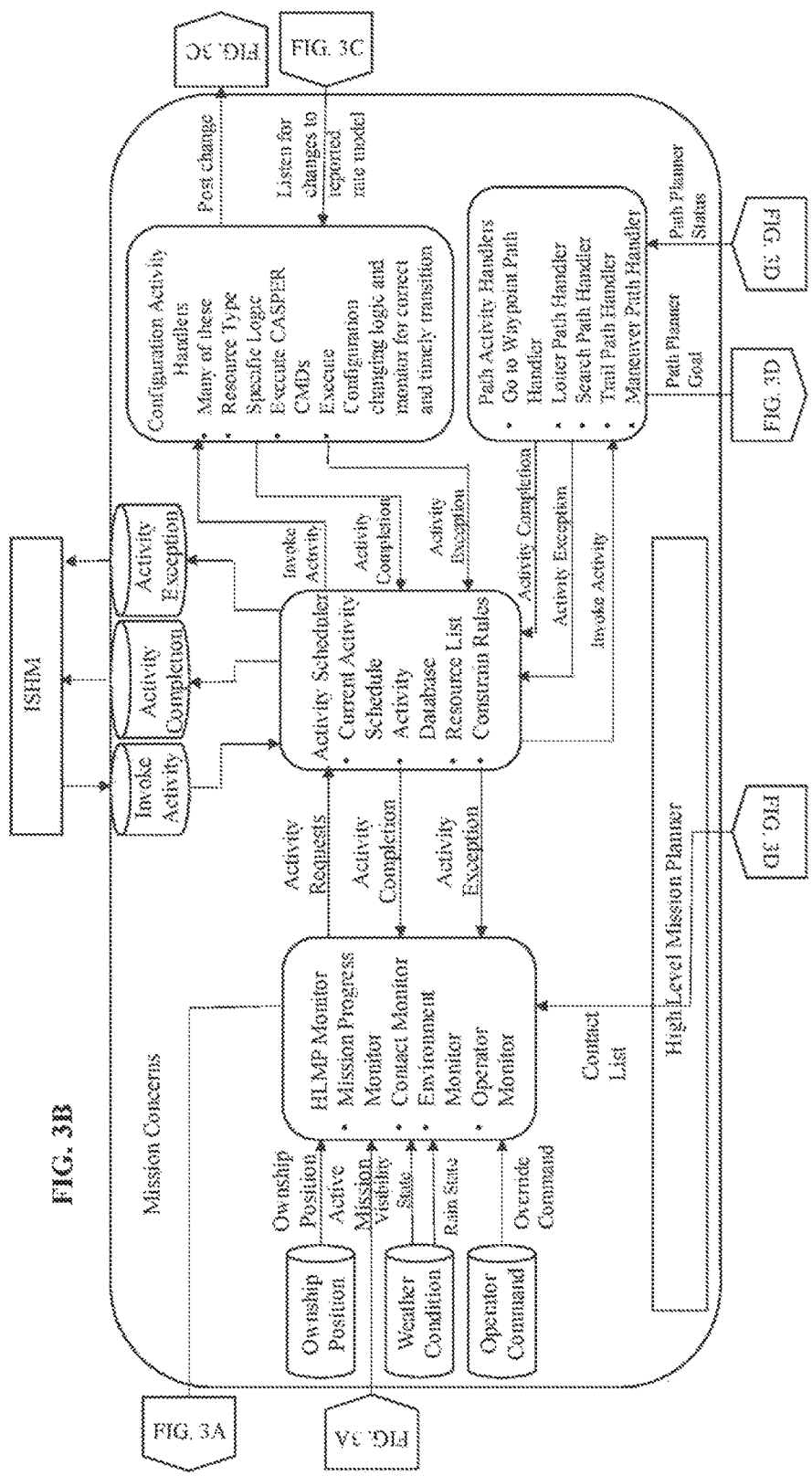
Figure 3C:
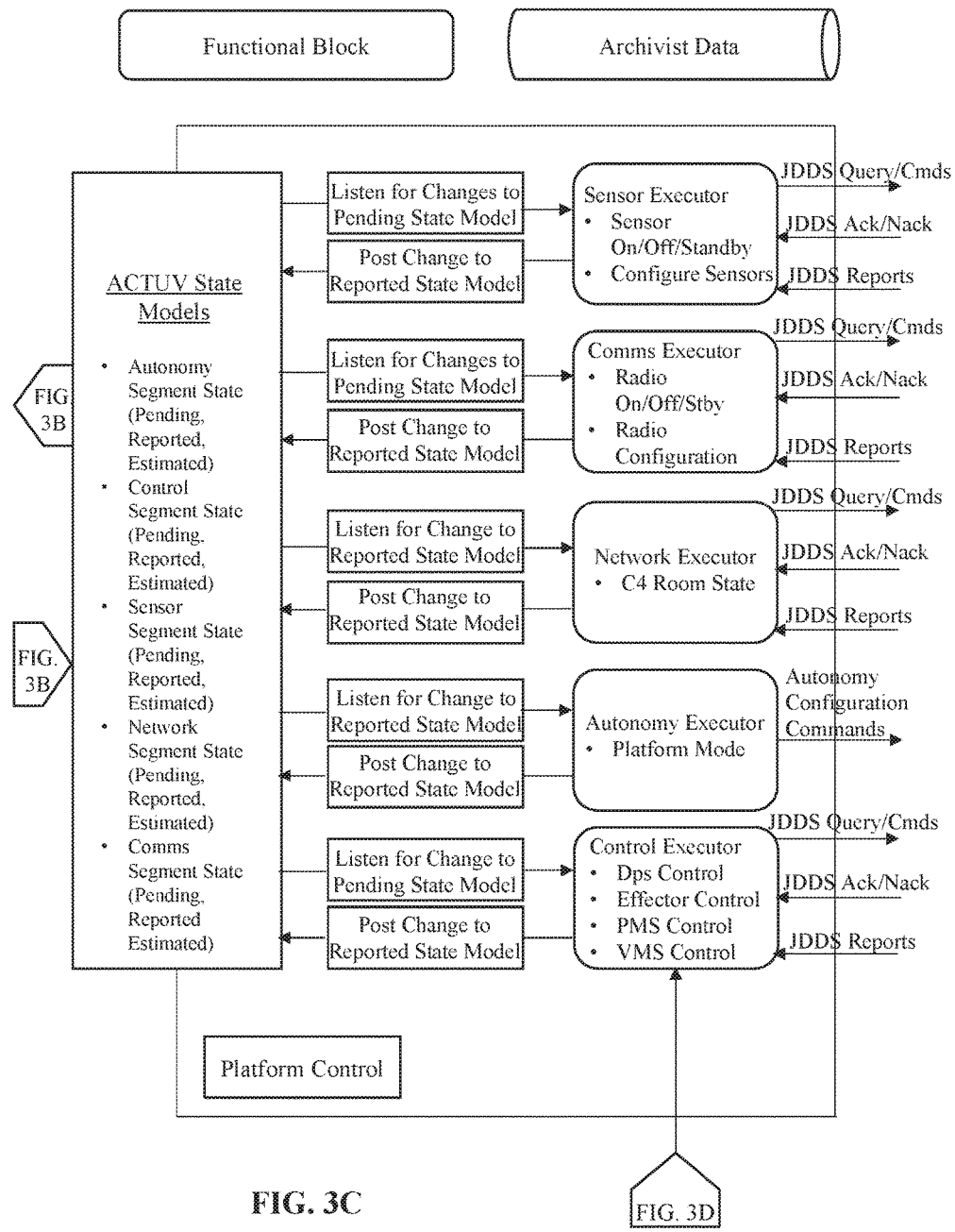
Figure 3D:
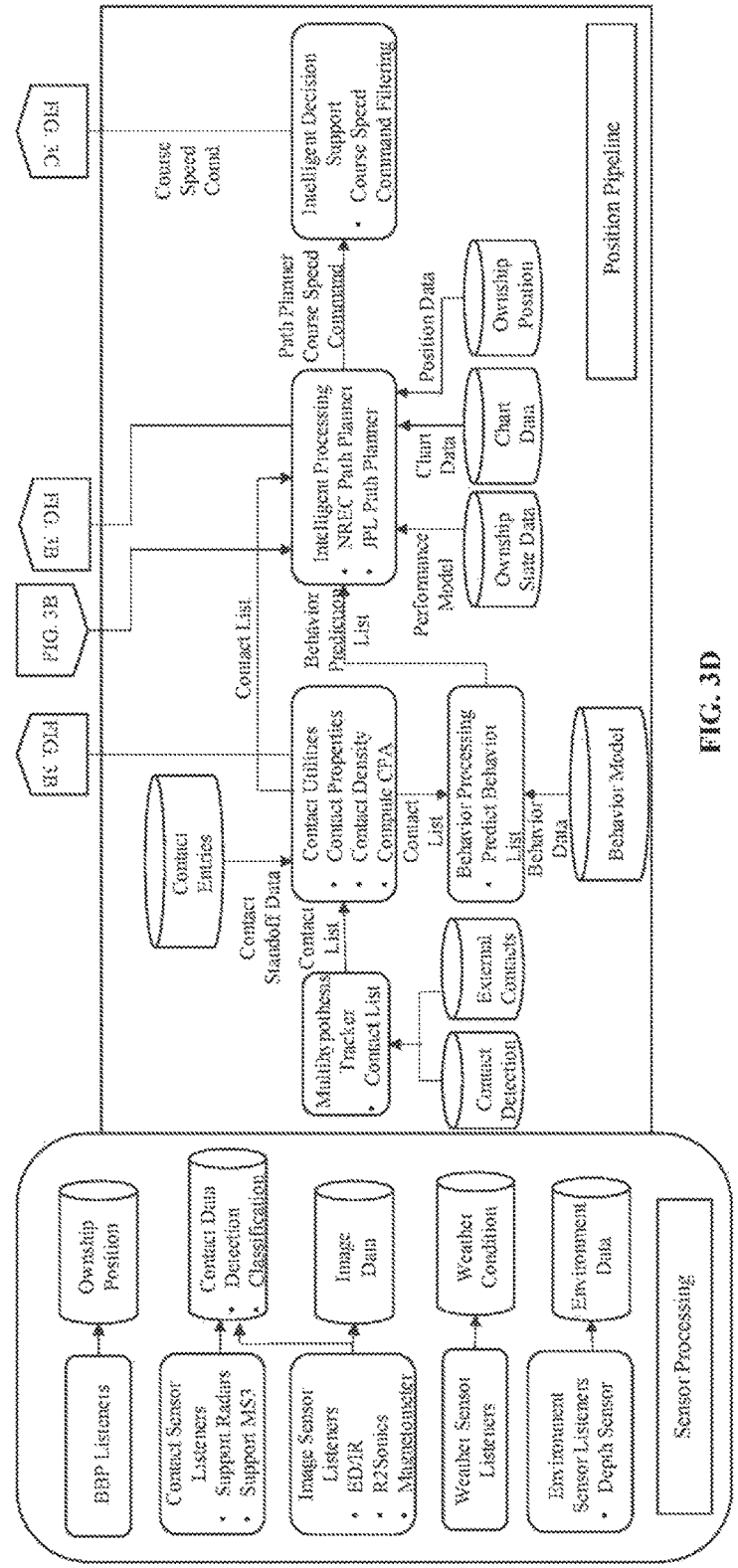

The embodiments herein improve the capabilities of robotic autonomous vessels designed to locate and track the extremely quiet diesel submarines that are finding their way into the navy fleets around the world. The ACTUV is equipped with navigation and piloting sensors, electro-optics, and long and short range radar. The ACTUV's modular design allows it to not only carry out anti-submarine warfare operations, but to be refitted for intelligence, surveillance, and reconnaissance missions. In addition, the vessel is able to report back on the situation and its condition and has computers programmed to identify other vessels and predict what they will do next.

As described in detail herein, the system and method of the present embodiments are developed as modular components that can be used with "any" (COTS (commercial off-the-shelf) or GOTS (Government off-the-shelf)) sensor suite to fuse data and determine the operating environment (surface contacts/tracks) and feed an autonomy decision engine to improve the vessel arbitration process in deciding which way to turn, how fast to go, obstacle avoidance, and mission monitoring. The embodiments described herein are intended to equip ACTUVs with the ability to obey the set of navigation rules published by the International Maritime Organization. Generally referred to as COLREGS (collision regulations). The COLREGS determine, in the event of an encounter between vessels, which vessel has the right of way (i.e., the "stand on" vessel) and the appropriate behavior for both the "stand on" and "give way" vessel to avoid a collision.

The autonomy architecture is designed for an independently deployable unmanned vessel and is based on a hybrid combination of hierarchical and tactical behaviors. The autonomy architecture is critical to mission success for the ACTUV by providing the Unmanned Vessel (UV) the agility to think and act in parallel. The autonomy architecture generates deliberative planning target tracking while simultaneously reacting to the requirements of the COLREGS and responding properly to developing tactical situations. A high level summary of the autonomy functional capabilities is shown in FIG. 1.

Figure 1:
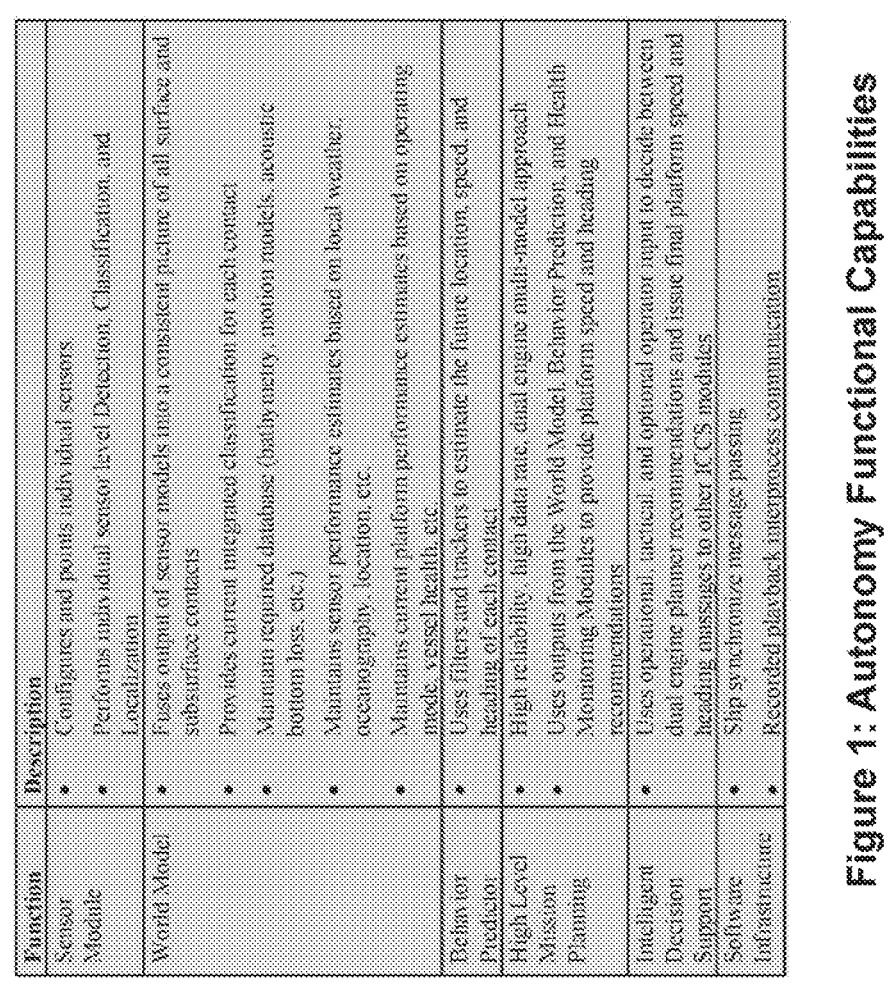

FIG. 1 depicts the central role of the Autonomy Segment 100 in the ACTUV system architecture 10. Sensor data from the Sensor Segment is depicted on the left under Inputs, along with mission guidance, operator control commands, operator data requests and operator updates to the world map. All ACTUV subsystems, including Autonomy itself will report status, events, alerts and alarms to Autonomy 100 to enable a robust OwnShip State assessment. High Level Mission Planning 105, Health Monitoring 110, Sensor Processing 115, Track Processing 120, Behavior Processing 125, Intelligent Processing 130, and Intelligent Decision Support 135 represent the major functional subcomponents of the Autonomy Segment 100 with various sub-functional detail provided therebelow.

Across the bottom of FIG. 2, the multiple boxes below "Autonomy Infrastructure (Repository)" represent the persistent autonomy domain data objects. On the right, the major Autonomy Outputs are detailed. Platform Commands and ACTUV Control Commands are on the right—these are the essential Outputs of Autonomy. The Remote Interface and Reporting Package 140 manages the interface to the remote operator (not shown). The remote operator can tune the amount of data and the frequency based on external operational constraints—such as available bandwidth. It is expected that OwnShip State (including position, current capability and alarms and alerts), surface contact reports and target reports will be sent from the ACTUV to the remote site at a periodicity set by operational needs.

The Communications, Network and Vessel Segments are not depicted in this Autonomy centric system context diagram. The Vessel Segment is hidden from Autonomy by the Controls Segment. The Network segment provide the JDDS (Java Data Distribution Service) infrastructure and reports Status, Events, Alerts and Alarms to Autonomy based on the HA (High Availability) hardware functionality. Communications acts as both a bent pipe to the remote operator and reports its own Status, Events, Alerts and Alarms to Autonomy.

The Autonomy Segment, i.e., autonomy software architecture, has been decomposed into multiple high level components (packages) as shown in FIG. 2 and further broken down in FIGS. 3a-3d. The functionality described as the World Model is encapsulated in three packages: The Sensor Processing Package 115, the Track Processing Package (TPP) 120 and the Behavior Processing Package (BPP) 125. The TPP performs sensor fusion, contact management, contact classification and contact identification.

The "engines" are encapsulated into the Intelligent Processing Package (IPP) 130. The IPP provides a modular interface to support a number of engines executing simultaneously. SHINE (Spacecraft Health Inference Engine) and Beam (Beacon-based Exception Analysis) are encapsulated in the Integrated System Health and Monitoring (ISHM) package 110. The High Level Mission Planner (HLMP) package 105 is responsible for the altering platform configuration (all the on/off switches et al.). The HLMP Package 105 provides operational mission guidance from remote to the ACTUV/Autonomy. Mission Guidance includes tactical guidance, sensor configuration, capability functions, mission modes, ACTUV state changes, operational constraints, conditional behavior logic (e.g. error condition behavior), etc. The HLMP also provides mission guidance logic to the IPP engines.

The Autonomy Infrastructure Package 140 provides infrastructural functions to the Autonomy Segment. The Autonomy Module parent class (evolved from ModUtil) provides inter-process control and communications and also interfaces with an open source software library used to provide high availability, scalability/clustering, and management services for software applications running in a tightly coupled distributed system, e.g., OpenClovis platform or SAFplus, to provide reliability. The Autonomy Infrastructure Package provides the Autonomy Repository; which contains the World Map. The External Interface Package, Output, provides the JDDS interface code used by SPP, ISHMP, ARP and HLMP to communicate with the rest of the ACTUV system.

The Track Processing Package (TPP) 120 is the component that provides the external awareness logic for Autonomy. The three main sub-components of the Track Processing Package (TPP) 120 are Tracker, Identifier and Designator. Tracker analyzes all the sensor data (fuses the data) and builds and maintains a ClassedContact List of all objects external to the ACTUV (OwnShip). ClassedContact objects in the ClassedContact List container include metadata provided from the Sensor segment as well as probabilistic tracks and additional metadata produced from tracking the ClassedContact entities. Identifier and Designator attempt to add additional metadata to assist in the tracking and to help refine the potential BehaviorModels later considered by the Behavior Processing Package.

The Multi-Hypothesis Tracking (MHT) algorithm tracks multiple targets over time in the presence of multiple measurements. It maintains multiple hypotheses of measurement-target association, and employs delayed decision-making to choose the most likely hypothesis after more measurements are made. The MHT also performs automatic track initiation, automatic track termination, and occlusion/coasting recognition. FIG. 4 depicts track processing input and output. The MHT algorithm is the central algorithm of the Tracker component of the Track Processing Package. The MHT algorithm takes sensor measurements as inputs. There are multiple sensors employed, including topside and underwater external sensors. The MHT Inputs are defined in Table 1 and the Outputs are defined in Table 2.

TABLE 1

MHT Inputs

| Name | Description |
| --- | --- |
| measurement_set | A set of measurements from a single sensor |

TABLE 2

MHT Outputs

| Name | Description |
| --- | --- |
| track_list | A list of contact tracks |

The original MHT algorithm is primarily attributed to Reid as described in his paper "An algorithm for tracking multiple targets," IEEE Transactions on Automatic Control, 24(6): 843-854, December 1979, which is incorporated by reference herein. The algorithm presented here is based on Cox and Hingorani's modification to use ranked assignment enumeration to limit the number of hypotheses considered as described in their paper, "An efficient implementation of Reid's multiple hypothesis tracking algorithm and its evaluation for the purpose of visual tracking," IEEE Transactions on Pattern Analysis and Machine Intelligence, 18(2): 138-150, February 1996, which is incorporated herein by reference. The specific representation of the algorithm employed in the present embodiments is commonly referred to as the "hypothesis-based" approach.

The MHT algorithm iteratively takes sets of sensor measurements and creates and updates contact tracks. The algorithm has the following features: automatic initiation of tracks for new contacts; automatic termination of tracks for contacts that have not been seen for some time; allows for contacts to be unmeasured for brief time spans; allows for measurements to be rejected as "false alarms"; and does not force an immediate decision of the best association involving a contact and/or a measurement. Additionally, the MHT algorithm: provides for target and measurement clustering to reduce the computation complexity (in some "good" scenarios, the computational complexity of MHT grows linearly to the number of targets); provides for multiple hypothesis propagation and delayed decision for correcting prior incorrect hypotheses of data association; provides for automatic track initiation and termination; provides for likelihood calculations may be based on kinematic measurements (position and speed) and appearance features (size, signal strength, color histogram, and edge histogram) when available; represents Murty's k-best ranked assignment algorithm for track-measurement association; provides for real-time execution; processes video, sonar and radar data sets.

TABLE 3

MHT Algorithm Terminology

| Term | Definition |
| --- | --- |
| Frame | An iteration of the algorithm that operates on a single set of measurements. |
| Local Hypothesis | The association between a single contact and/or measurement. It includes one contact, one measurement, or both. |
| Entity State | The state of a contact at a given point in time. |
| Cluster | A group of independent contacts and/or measurements. These can be considered separately from all other clusters. Each contact or measurement belongs to a single cluster. |

TABLE 3-continued

MHT Algorithm Terminology

| Term | Definition |
| --- | --- |
| Cluster Hypothesis | A set of local hypotheses that cover all of the contacts and measurements in a cluster exactly once. |
| Global Hypothesis | A set of local hypotheses that cover all current clusters. |

TABLE 4

MHT Core Algorithms Description

| Names | Descriptions |
| --- | --- |
| Clustering | The Cluster represents a grouping of Targets and Measurements that are within a local area of an image frame. A Measurement is placed in a Target's Cluster if it falls within its Validation Region (this is determined by the variance of the estimated position of the Target and the eta-squared parameter in m_tracker). If a Measurement is within the Validation Region of two Targets, then all three objects will be in the same cluster, and so on as so all connected components are in the same Cluster. |
| Local Hypothesis Generation | A Local Hypothesis is an atomic component of a Global Hypothesis. It can be one of the following Hypotheses about a Target and/or Measurement: Association between existing Target and new Measurement Measurement is a new Target Measurement is a False Alarm Target is occluded Target is gone |
| Cluster Hypothesis Generation | The Cluster Hypothesis class is the basic grouping of Local Hypotheses (such as target-measurement associations, false alarm hypotheses, etc. - see CLHypothesis.h). The Cluster Hypothesis includes a hypothesized explanation for every measurement and previously hypothesized target in that cluster. |
| Global Hypothesis Generation | A global hypothesis is built from selecting a cluster hypothesis from each cluster hypothesis set. The global hypothesis set is formed from by the "combinations" of selecting one cluster hypothesis from each cluster hypothesis set. |
| Hypothesis Pruning | A technique to remove the "old" hypotheses that are increasing becoming "unlikely". |
| Likelihood Computation | Computes the likelihood for each hypothesis based on the measurement and target association cost and its parents' hypothesis likelihood. |
| State Estimation (prediction and updating) | A mathematical formulation that uses a series of measurements observed over time, containing noise and other inaccuracies, and produces estimates of unknown states that often are more precise than those produced based on a single measurement. It may include any of Kalman filter, Interacting Multiple Model filter, and Particle filter. |
| K-best Hypotheses Assignment Ranking | A mathematical formulation that selects the k "best" assignments from all possible assignments by progressively selecting the "best" assignment, the next "best" assignment, and so on. It is achieved by iteratively increasing the "exclusion constraints" and decreasing the "inclusion constraints". |
| Fusion algorithm | Fuse multisensor target attribute data to more reliably determine the target type and identity. |
| Track-to-track Association | The track-to-track association algorithm takes in the tracks formed at sensor level and combine them into a single track if they indeed belong to the same target. It is accomplished by using the Kanyuck-Singer track correlation functions. |

The MHT algorithm gets its name by maintaining multiple hypotheses of measurement-to-contact association. In each frame, each hypothesis retained from the immediately previous frame will cause the creation of multiple hypotheses in the current frame. These hypotheses form trees, which grow exponentially. To limit this growth, hypotheses under consideration are eliminated in two ways. The first way is by selecting some number of the most likely hypotheses at each step/level, while the rest are eliminated. The second way is by explicitly pruning the global hypothesis tree at the end of each frame.

An overview of a frame (single iteration) of the algorithm is presented in FIG. 5 MI-IT Algorithm Overview. The steps in the MHT algorithm are described in Table 5 and FIG. 6. These descriptions reference details in the sections that follow as necessary.

TABLE 5

MHT Algorithm Step Descriptions

| Step | Description |
| --- | --- |
| Get New Measurement Set | Collects and assembles an entire measurement set. |
| Cluster Measurements and Contacts | Groups measurements and contacts into independently computable clusters. This step of the algorithm is described in detail in Section Error! Reference source not found.. |
| Generate Local Hypotheses | Generates new local hypotheses based on previously-known contacts and new measurements. |
| Select Most Likely | From the list of all possible local hypotheses, selects the most likely |

TABLE 5-continued

MHT Algorithm Step Descriptions

| Step | Description |
| --- | --- |
| Sets of Local Hypotheses | sets of them. Each set of local hypotheses is a new cluster hypothesis. |
| Generate Cluster Hypotheses | Indicates that hypothesis generation for each cluster consists of the generation and selection of local hypotheses. |
| Select Most Likely Sets of Cluster Hypotheses | From the list of all generated cluster hypotheses, selects the most likely sets of them. |
| Generate Global Hypotheses | Indicates that global hypothesis generation consists of the generation and selection of cluster hypotheses. |
| Prune Global Hypotheses | Reduces the size of the hypothesis tree by eliminating unlikely hypotheses or "dead" branches of the tree. |
| Predict Contact Positions | Uses the contact state estimator to predict the contact's position at the time of measurement. |
| Output Best Global Hypothesis | Selects the most likely global hypothesis for a given time (which is a previous frame due to delayed decision-making). |

The "cluster measurement and contacts" step groups all contacts that share common measurements within their gates together so that the area of interest is partitioned into a number of manageable clusters of contacts/measurements. By partitioning the world, each cluster contains a manageable number of contacts and measurements, which allows each cluster to be processed separately. This is a divide-and-conquer approach to tracking multiple targets. Table 6 describes the clustering inputs. While Table 7 describes the clustering outputs.

TABLE 6

Clustering Inputs

| Name | Description |
| --- | --- |
| measurement_set | A set of measurements from a single sensor |
| predicted_entity_states | Predicted entity states at the beginning of this iteration |

TABLE 7

Clustering Outputs

| Name | Description |
| --- | --- |
| current_clusters | List of Clusters for the current iteration of the algorithm |

A cluster represents a grouping of contacts and measurements that are within the validation ranges (gates) of the contacts. A measurement is placed in a cluster if it falls within the cluster's validation region (which is the union of the validation ranges of its contained contacts). If a single measurement is within the validation range of two contacts, then all three objects will be in the same cluster. Any number of contacts and measurements may "chain" this way to form a single cluster. If a measurement is not within the validation range of any contact, it forms its own cluster.

The validation area of a contact is defined as the area within which the association likelihood between a contact and measurement exceeds an eta-squared parameter.

An example of the results of clustering in a non-trivial environment is shown in FIG. 7. Clusters are formed by iteratively associating measurements with entity states as given in Algorithm 0.1.

Algorithm 0.1 Form Clusters

For each entity state in the current frame do
    Create a new cluster containing only that entity state
For each measurement in the current frame do
    For each cluster do
        For each entity in cluster do
            If association likelihood between measurement and
            entity exceeds threshold, add measurement to cluster.
        If measurement is in multiple clusters, merge those clusters into
        a single cluster.
For each measurement not in a cluster do
    Create a new cluster containing only that measurement An atomic hypothesis is a component of a global hypothesis. It describes a single possible relationship between a given contact and/or a given measurement. It also contains a likelihood value for that association. Atomic hypotheses are generated as part of the generation of a cluster hypothesis. A cluster hypothesis then contains a set of atomic hypotheses that generate local hypothesis inputs as shown in Table 8 and local hypothesis outputs as shown in Table 9.

TABLE 8

Local Hypothesis Generation Inputs

| Name | Description |
| --- | --- |
| contact_list | List of contacts in the current cluster. May be empty. |
| measurement_list | List of measurements in the current cluster. May be empty. |

TABLE 9

Local Hypothesis Generation Outputs

| Name | Description |
| --- | --- |
| local_hypothesis_list | List of all possible local hypotheses in the current cluster. |

An atomic hypothesis describes the target/contact and measurement status, and their associations. It can be in one of the following cases: Measurement is a new target/contact initiation; Measurement is a false alarm; Association between existing targets/contacts and a new measurement; Target/contact is occluded; and Target/contact is terminated.

The algorithm described in this section corresponds to the box "Generate Feasible Local Hypotheses" in the MHT flow chart in FIG. 6. It explains the target/contact and measurement status and associations as described above. Algorithm 0.2 describes how atomic hypotheses are created.

Algorithm 0.2 Create Atomic Hypotheses

For each track t do
   Create an "Unobserved Entity" hypothesis containing t
For each measurement m do
   Create a "False Observation" hypothesis containing only m
   Create an "Observed New Entity" hypothesis containing only m
For each track t do
   For each measurement m do
     Create an "Observed Entity" hypothesis containing both t and m Next, the K-Best Hypotheses Assignment Ranking step selects the k best combinations of hypotheses from a set of possible hypotheses. The same core algorithm is used for selecting both atomic hypotheses within a cluster and cluster hypotheses at the global level. The difference between the two usages is how the cost matrix is populated. Table 10 describes the K-Best inputs and Table 11 describes the K-Best outputs.

TABLE 10

K-Best Inputs

| Name | Description |
| --- | --- |
| cost_matrix | A square matrix containing assignment costs between the rows and columns |

TABLE 11

K-Best Outputs

| Name | Description |
| --- | --- |
| solution_sets | Sets of (cost, row assignment, column assignment) triplets |

This approach to the k-best assignment problem is based on Murty's method described in K. G. Murty, An algorithm for ranking all the assignments in order of increasing cost, Operations Research 16 (1968) 682-687, which is incorporated herein by reference in its entirety. The exact algorithm used is a modification of the algorithm given by Cox and Miller described in I. J. Cox and M. L. Miller, On finding ranked assignments with application to multi-target tracking and motion correspondence, IEEE Trans. on Aerospace and Electronic Systems, 32(1):486-489, 1995, which is incorporated herein by reference. The high-level algorithm is given in Algorithm 0.3.

Algorithm 0.3 K-Best Assignment Algorithm Overview

Initialize the priority queue of solutions with a minimal partial assignment
For i=1 to k do
   Make the top of the priority queue a complete solution if it is not already complete
   Add this solution to the returned solutions list
   Partition the remaining problem The "minimal partial assignment" used to initialize the priority queue is the result of the first 3 steps of the Jonker-Volgenant assignment algorithm described in R. Jonker and A. Volgenant, A shortest augmenting path algorithm for dense and sparse linear assignment problems, Computing 38, 325-340 (1987), which is incorporated herein by reference. The algorithm for making a complete solution is given in Algorithm 0.4. The algorithm for partitioning the remaining problem is given in Algorithm 0.5.

Algorithm 0.4 K-Best Solution Completion

While the top structure on the queue does not contain a complete solution do
   Take the top structure, <P, s, u, v, c>, off the queue.
   costLimit=∞
   If the queue is not empty do
     costLimit=cost of the next structure on the queue
   Apply JV augmentations until costLimit is reached.
   If the solution could not be completed (c=∞)
     Drop the partial solution
   Else If the solution is now complete
     Push the now-complete solution <P, S, U, V, C> onto the queue.
   Else If the next partial solution in the queue is now cheaper
     Push the still-partial solution <P, s, u, v, c> back onto the queue.

Algorithm 0.5 K-Best Partitioning

For m=1 to n
   minY[m] = −1 (an invalid value)
deadY = −1
While S is not empty
   highSlack = −∞
   For m=1 to n (loop over all columns in P)
     If $minY[m] = deadY (always true the first time)
       $minSlack[m] = ∞
       For All < $y_j$, $z_m$, 1 > in P but not in S
         slack = 1 − U[m] − V[j]
         If slack < minSlack[m]
           minSlack[m] = slack
           minY[m] = j
     If minSlack[m] > highSlack
       highSlack = minSlack[m]
       highZ = m
   m = highZ
   Find the triple < $y_j$, $z_m$, 1 > that contains $z_m$ in S.
   Let P' = P, s' = S, u' = U, and v' = V (Copy previous best solution S into s')
   Remove < $y_j$, $z_m$, 1 > from P'
   Remove < $y_j$, $z_m$, 1 > from s'
   deadY = j
   c' = C + highSlack
   Place < P', s', u', v', c' > onto the priority queue.
   From P remove all triples < $y_h$, $z_m$, 1 >, h ≠ j.
   From P remove all triples < $y_j$, $z_h$, 1 >, h ≠ i.
   Remove < $y_j$, $z_m$, 1 > from S.

Hypothesis pruning is done in two ways. The first way is to reduce the number of global hypotheses retained within each frame. The second way is to discard hypotheses older than a given time. To reduce the number of global hypotheses retained within each frame, all global hypotheses within the frame are ordered by likelihood, and only the top N are retained. All others are discarded. Hypotheses older than a given time (sometimes called the N-back interval) are removed from the hypothesis tree. The new root of the tree is chosen so that most likely hypothesis in the current frame is retained. All hypotheses that are not descendants of the new tree root hypothesis are discarded.

Cluster hypothesis generation consists of enumeration of all possible atomic hypotheses in the cluster, then application of the K-best hypothesis ranking.

Tracking filters are a critical component of a target tracking system. It takes the prior estimation of the current state and the current measurement to produce the "best" estimation for the next state. It provides track state estimation for a tracker to correctly associate the measurements with track states.

Four motion models are considered: 1) constant velocity, 2) constant acceleration, 3) a mixed mode of constant velocity and constant acceleration, and 4) a mixed mode of constant velocity and turn/maneuvering. The motion models are run through three different classes of tracking filters, Kalman Filter, Interacting Multiple Model Filters and a Particle Filter.

Figure 8:
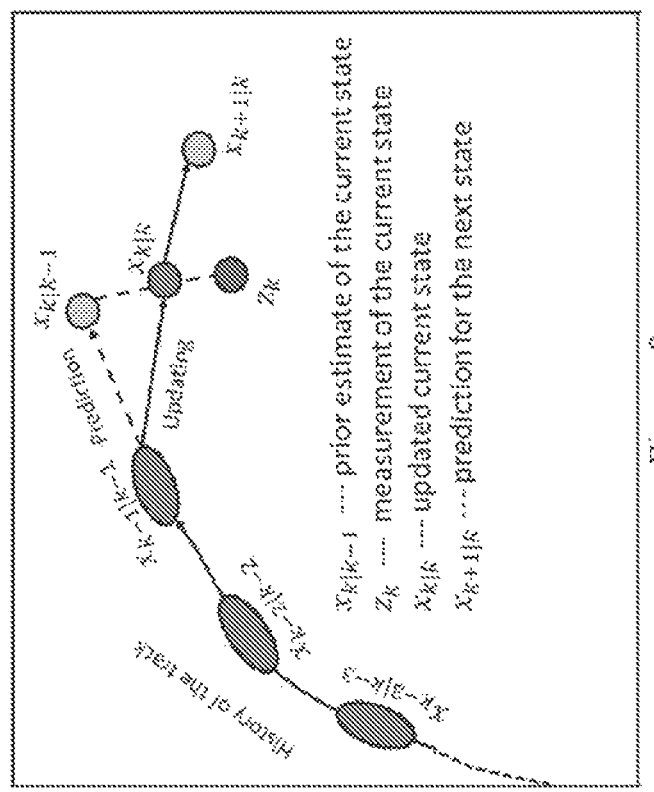
FIG. 8 shows the functionality of a generalized tracking filter applied to the clustering result of FIG. 7 supporting operation of an Anti-Submarine Warfare (ASW) Continuous Trail Unmanned Vessels (ACTUV) in accordance with one or more embodiments herein.

The functionality of a generalized tracking filter is depicted in FIG. 8. We developed a bootstrap particle filter and a bootstrap particle IMM filter using MATLAB as a part of this analysis. We used the MATLAB toolbox EKF/UKF to provide additional capabilities for the analysis. The toolbox contains various implementations of Kalman filters, extended Kalman filters, unscented Kalman filters, and Kalman IMM filters, as well as some modeling examples. A tracking filter generally involves an update phase and a prediction phase. At time t=k, the update phase of the tracking filter, shown in FIG. 8, takes the prior estimation of the current state x_(k|k−1), the current measurement z_k, and associated uncertainties to produce the updated estimate of the current state x_(k|k). The prediction phase of the filter takes the updated estimate of the current state x_(k|k) and produces the state estimate for the next state x_(k+1|k) based on the system dynamics. In the case of the unscented Kalman filter and the particle filter, during the prediction phase, both produce multiple state predictions, and during the update phase, produce a single updated estimation by combining the multiple state predictions with the measurements. Different tracking filters formulate these two steps differently. Their performances vary under various conditions and scenarios. Depending upon different system dynamics, the Kalman filters considered include two types: linear and nonlinear. Nonlinear Kalman filters can be further divided into Extended Kalman filters and unscented Kalman filters. A linear Kalman filter has linear systems dynamics, i.e. the state at t=k is a linear function of the state at t=k−1. Table 12 provides a summary of the terminology and equations of a linear Kalman filter.

TABLE 12

| Equation Types | Descriptions |
| --- | --- |
| System and Measurement Equations | System State: $x_k = F_k x_{k-1} + B_k u_k + w_k$, $w_k \sim N(0, Q_k)$ <br> Measurements: $z_k = H_k x_k + v_k$, $v_k \sim N(0, R_k)$ |
| Prediction Equations | State predict: $\hat{x}_{k|k-1} = F_k \hat{x}_{k-1|k-1} + B_{k-1} u_{k-1}$ <br> Covariance predict: $\hat{P}_{k|k-1} = F_k \hat{P}_{k-1|k-1} F_k^T + Q_k$ |
| Update Equations | measurement residual: $\tilde{y}_k = z_k - H_k \hat{x}_{k|k-1}$ <br> Measurement covariance update: $S_k = H_k \hat{P}_{k|k-1} H_k^T + R_k$ <br> Kalman Gain: $K_k = \hat{P}_{k|k-1} H_k^T S_k^{-1}$ |

TABLE 12-continued

| Equation Types | Descriptions |
| --- | --- |
| | Update (a posteriori) state estimate: $\hat{x}_{k|k} = \hat{x}_{k|k-1} + K_k \tilde{y}_k$ <br> Update (a posteriori) covariance estimate: <br> $\hat{P}_{k|k} = (I - K_k H_k) \hat{P}_{k|k-1}$ |

A nonlinear Kalman filter has nonlinear system dynamics, i.e., the state at t=k is a nonlinear function of the state at t=k−1. In order to apply the Kalman filter to nonlinear systems, the system and measurement equations are linearized. Table 13 provides a summary of the terminology and equations of an extended Kalman filter.

TABLE 13

| Equation Types | Descriptions |
| --- | --- |
| System and Measurement Equations | System State: $x_k = f(x_{k-1}, u_{k-1}) + w_{k-1}$, $w_{k-1} \sim N(0, Q_k)$ <br> Measurements: $z_k = h(x_k) + v_k$, $v_k \sim N(0, R_k)$ |
| Prediction Equations | State predict: $\hat{x}_{k|k-1} = f(\hat{x}_{k-1|k-1}, u_{k-1})$ <br> Covariance predict: $\hat{P}_{k|k-1} = F_{k-1} \hat{P}_{k-1|k-1} F_{k-1}^T + Q_{k-1}$, where $F_{k-1}$ is defined below in the linearization box of the table. |
| Update Equations | Measurement residual: $\tilde{y}_k = z_k - h(\hat{x}_{k|k-1})$ <br> Measurement covariance update: <br> $S_k = H_k \hat{P}_{k|k-1} H_k^T + R_k$, where $H_k$ is defined below in the linearization box of the table. <br> Kalman Gain: $K_k = \hat{P}_{k|k-1} H_k^T S_k^{-1}$ <br> State estimate update: $\hat{x}_{k|k} = \hat{x}_{k|k-1} + K_k \tilde{y}_k$ <br> Covariance estimate update: <br> $\hat{P}_{k|k} = (I - K_k H_k) \hat{P}_{k|k-1}$ |
| Linearization of state transition matrix and measurement matrix | State transition matrix: <br> $F_{k-1} = \left. \dfrac{\partial f}{\partial x} \right|_{\hat{x}_{k-1|k-1}, u_{k-1}}$ <br> measurement matrix: <br> $H_k = \left. \dfrac{\partial h}{\partial x} \right|_{\hat{x}_{k|k-1}}$ |

Extended Kalman filters basically use the formulation of a linear Kalman filter to solve the nonlinear system problems by linearizing the nonlinear system equation. When the system equation is highly nonlinear, the extended Kalman filter might yield poor performance. One solution to the highly nonlinear problem is the use of an unscented Kalman filter. This approach avoids the approximation by linearization and computing of the Jacobian required by EKF. It deterministically selects a set of points (sigma points) around the state estimation and the weights associated with each sigma points. It then projects this set of points through the system equations to produce a set of state estimations associated with the sigma points. The projected sigma points are recombined to form the state prediction and the covariance prediction. Similarly, the update equations are formed with the recombination of the projected sigma points. Table 14 provides a summary of the terminology and equations of the unscented Kalman filter.

TABLE 14

| Equation Types | Descriptions |
| --- | --- |
| System and Measurement Equations | System State: $x_k = f(x_{k-1}, u_{k-1}) + w_{k-1}$, $w_{k-1} \sim N(0, Q_k)$<br>Measurements: $z_k = h(x_k) + v_k$, $v_k \sim N(0, R_k)$ |
| Prediction Equations | Sigma points: a set of 2L + 1 points, $\chi_{k|k-1}^i$, derived from the "augmented states" (see Appendix)<br>State predict:<br>$$\hat{x}_{k|k-1} = \sum_{i=0}^{2L} W_s^i f(\chi_{k-1|k-1}^j)$$<br>Covariance predict:<br>$$\hat{P}_{k|k-1} = \sum_{i=0}^{2L} W_C^i [W_C^i [f(\chi_{k-1|k-1}^j) - \hat{x}_{k|k-1}])[f(\chi_{k-1|k-1}^j) - \hat{x}_{k|k-1}]^T$$<br>Sigma points projected through $h(x_k)$: $\gamma_k^i = h(\chi_{k|k-1}^i)$<br>Measurement residual:<br>$$\tilde{y}_k^i = \gamma_k^i - \left(\sum_{i=0}^{2L} W_s^i \gamma_k^i\right)$$ |
| Update Equations | Measurement covariance update:<br>$$S_k = \sum_{i=0}^{2L} W_c^i \tilde{y}_k^i \tilde{y}_k^{iT}$$<br>Cross-covariance matrix:<br>$$P_{x_k z_k} = \sum_{i=0}^{2L} W_c^i [\chi_{k|k-1}^j - \hat{x}_{k|k-1}] \tilde{y}_k^{iT}$$<br>Kalman Gain: $K_k = P_{x_k z_k} S_k^{-1}$<br>State estimate update:<br>$$\hat{x}_{k|k} = \hat{x}_{k|k-1} + K_k \left[z_k - \left(\sum_{i=0}^{2L} W_s^i \gamma_k^j\right)\right]$$<br>Covariance estimate update: $P_{k|k} = P_{k|k} - K_k S_k K_k^T$ |

Figures 9, 10:
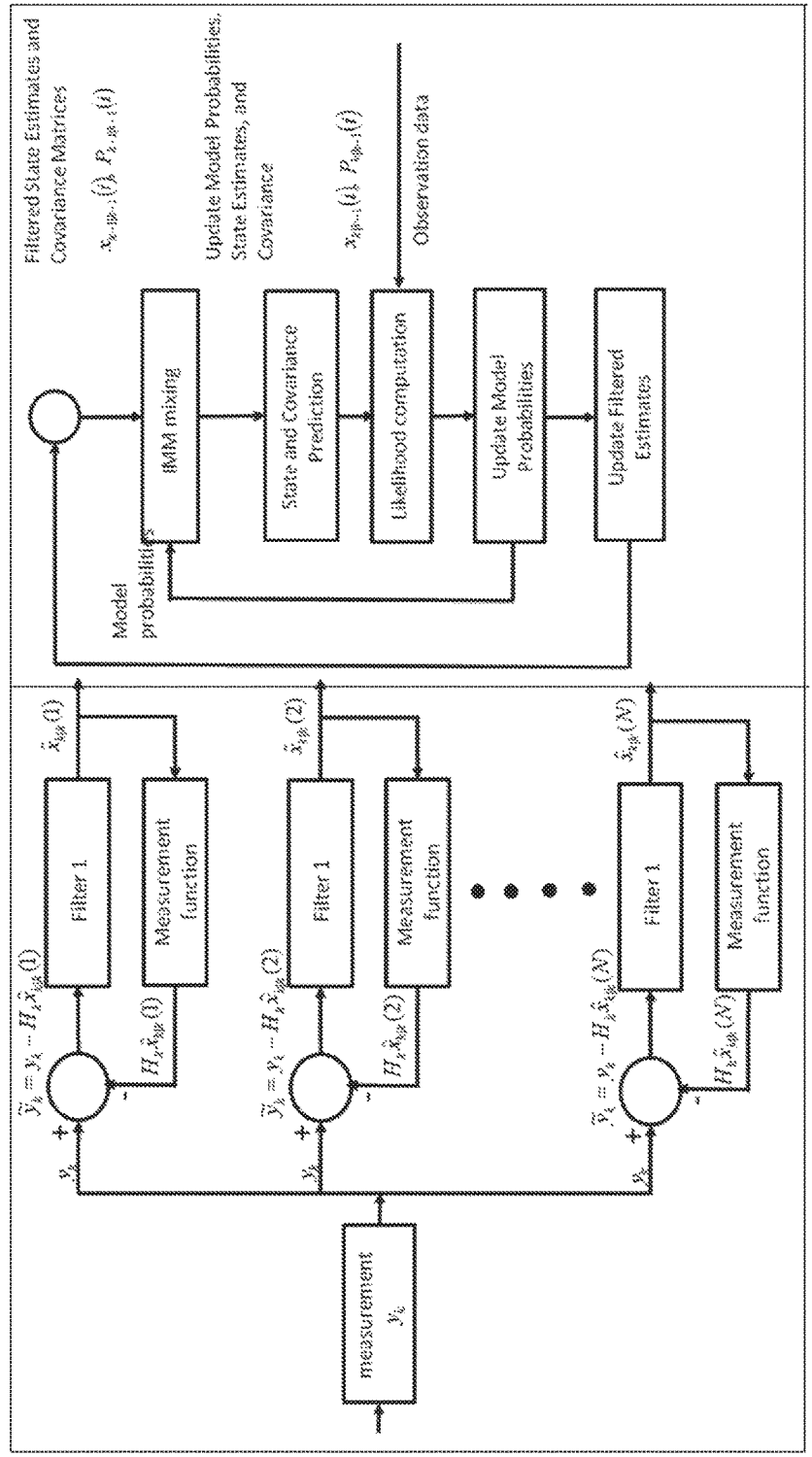
FIG. 9 is a block diagram of an Interacting Multiple Model (IMM) filter formed by a weighted sum of individual filters of FIG. 8 supporting operation of an Anti-Submarine Warfare (ASW) Continuous Trail Unmanned Vessels (ACTUV) in accordance with one or more embodiments herein.
FIG. 10 is a flow chart of an IMM filter supporting operation of an Anti-Submarine Warfare (ASW) Continuous Trail Unmanned Vessels (ACTUV) in accordance with one or more embodiments herein.

As different sections of the trajectory of a moving target may be better tracked by different types of Kalman filters, a filter bank consisting of different types of Kalman filters can be run in parallel, in which each Kalman filter in the filter bank produces its own estimation of the current states based on the estimations of past states. At any given time, the state estimation produced by the Interacting Multiple Model (IMM) filter is formed by a weighted sum of individual filters. The weights are determined by the state prediction quality of each filter, i.e., how well a state estimate fits the measurement. FIG. 9 shows the block diagram of an IMM filter and FIG. 10 shows the flow chart of an IMM filter. Table 15 provides a summary of the terminology and equations of IMM filter.

TABLE 15

| Equation Types | Descriptions |
| --- | --- |
| Individual filtered state and covariance | State obtained from filter j in the filter bank: $\hat{x}_{k-1|k-1}(j)$<br>Covariance obtained from filter j in the filter bank: $P_{k-1|k-1}(j)$ |
| Model mixing probabilities | Prior model probability for filter i: $\mu_{k-1}(i)$<br>Model Transition Probability from filter i to filter j: $P_{tr}(i, j)$<br>Model mixing probability:<br>$$\mu_{k-1|k-1}(i, j) = \frac{1}{\bar{C}_j} P_{tr}(i, j) \mu_{k-1}(i),$$<br>Normalizing factor:<br>$$\bar{C}_j = \sum_{i=1}^{m} p(i, j) \mu_{k-1}(i)$$ |
| Mixed initial state and covariance | Mixed state for filter j:<br>$$\hat{x}_{k-1|k-1}^0(j) = \sum_{i=1}^{m} \hat{x}_{k-1|k-1}(i) \mu_{k-1|k-1}(i, j)$$ |

TABLE 15-continued

| Equation Types | Descriptions |
| --- | --- |
| | State residual for filter i and filter j:<br>$SR_{k-1|k-1}(i, j) = \hat{x}_{k-1|k-1}(i) - \hat{x}_{k-1|k-1}^0(j)$<br>Mixed Covariance for filter j:<br>$$P_{k-1|k-1}^0(j) = \sum_{i=1}^{m} \mu_{k-1|k-1}(i, j)$$<br>$\{P_{k-1|k-1}(i) + SR_{k-1|k-1}(i, j) * SR_{k-1|k-1}(i, j)^T\}$ |
| Model-matched filtering<br>Model probability update | Likelihood for filter j: $\Lambda_k(j) = \text{prob}(z_k|M_{k(j)}, \hat{x}_{k-1|k-1}^0(j), P_{k-1|k-1}^0(j))$<br>Updated model probability: $\mu_k(k) = 1/c\, \Lambda_k(j) \bar{C}_j$<br>Normalizing factor:<br>$$C = \sum_{j=1}^{m} \Lambda_k(j) \bar{C}_j$$ |
| Weighted mean of state and weighted mean of covariance | Weighted mean of state:<br>$$\hat{x}_{k|k} = \sum_{j=1}^{m} \hat{x}_{k|k}^j \mu_k(j)$$<br>State residual for filter j and the weighted mean of state:<br>$SR_{k|k}(j) = \hat{x}_{k|k}(j) - \hat{x}_{k|k}$<br>Weighted mean of covariance:<br>$$P_{k|k} = \sum_{j=1}^{m} \mu_k(j) \{P_{k|k}(j) + SR_{k|k}(j) SR_{k|k}(j)^T\}$$ |

Observe that the IMM filter formulation in Table 15 does not specify which type of filters in the filter bank is used for state estimation. This observation allows us to extend the above IMM filter architecture to include filters other than Kalman filters.

While no effective Kalman filters exist for systems with non-Gaussian environments, particle filters are designed for systems with non-Gaussian noise. In a particle filter, instead of using a single state estimate with its uncertainty (expressed in covariance), a set of randomly sampled states (called particles) are used for state estimation. Each particle is projected through the system and measurement equations to form the "predictions" and to form the likelihood of each particle and the measurement. The likelihood of measurement ($z_k$) vs. each predicted particle ($h(x_{k|k-1}^i)$) is computed from the conditional, $prob(z_k|h(x_{k|k-1}^i), v_k)$, which forms the basis for computing weights. Table 16 summarizes the terminology and equations for bootstrap particle filter.

TABLE 16

| Equation Types | Descriptions |
|---|---|
| System and Measurement Equations | System State: $x_k = f(x_{k-1}, u_{k-1}) + w_{k-1}$, $w_{k-1} \sim N(0, Q_k)$<br>Measurements: $z_k = h(x_k) + v_k$, $v_k \sim N(0, R_k)$ |
| Prediction equations | Particles: a set randomly sampled states, $\{x_{k|k-1}^i\}_i$ |
| Update equations | Measurement residual for particle i: $\tilde{y}_k^i = z_k - h(x_{k|k-1}^i)$<br>Likelihood for particle i: $\wedge_{k|k}^i = prob(z_k|h(x_{k|k-1}^i), v_k)$<br>Unnormalized weights for particle i: $w_{k|k}^i = w_{k|k-1}^i \cdot \wedge_{k|k}^i$<br>Normalizing factor for weights: $w_{k|k}^i = w_{k|k}^i/(\Sigma_{all\ q} w_{k|k}^q)$<br>Importance sampling algorithm (see Appendix)<br>Weighted mean of state: $x_{k|k} = \Sigma_{all\ q} w_{k|k}^q \cdot x_{k|k-1}^q$ |

To better understand the tracking filters behaviors, examine four motion scenarios described in Table 17.

TABLE 17

| Scenarios | Filters Used in Each Scenario | | | | | |
|---|---|---|---|---|---|---|
| 1. constant velocity motion | KF1 | KF2 | KIMM | PF1 | PF2 | PIMM |
| 2. constant acceleration motion | KF1 | KF2 | KIMM | PF1 | PF2 | PIMM |
| 3. mixed motion of constant velocity and constant acceleration | KF1 | KF2 | KIMM | PF1 | PF2 | PIMM |
| 4. mixed motion of constant velocity and maneuvering/turning | KF1 | EIMM | UIMM | PF1 | PF3 | PIMM2 |

In scenario 1, constant velocity, the following six (a-f) tracking filters are compared:
 a. Linear Kalman filter (KF1) with a system function of states—position and velocity;
 b. Linear Kalman filter (KF2) with a system function of states—position, velocity, and acceleration;
 c. KIMM filter of two modes (KF1+KF2): linear Kalman filter in a, and linear Kalman filter in b;
 d. Particle filter (PF1) with a system function of states—position and velocity.
 e. Particle filter (PF2) with a system function of states—position, velocity, and acceleration
 f. PIMM filter of two modes (PFI+PF2): filter in d, and filter in e The input to each tracking filter is a set of simulated measurement data. The reference system states for generating the measurement data in this case is $$x_k = [x_k^1\ x_k^2\ x_k^3\ x_k^4]^T,$$

where k is time, and $x_k^1$, $x_k^2$, $x_k^3$, $x_k^4$ are the position in x, y, and velocity in x and y directions.

The state sequence is produced according to the following system equation, $$x_k = Fx_{k-1} + w_k,\ \ w_k \sim N(0, Q_k)$$

$$\text{where} = \begin{bmatrix} 1 & 0 & 0.1 & 0 \\ 0 & 1 & 0 & 0.1 \\ 0 & 0 & 1 & 0 \\ 0 & 0 & 0 & 1 \end{bmatrix},$$

$$Q_k = \begin{bmatrix} 3.33*10^{-6} & 0 & 5*10^{-5} & 0 \\ 0 & 3.33*10^{-6} & 0 & 5*10^{-5} \\ 5*10^{-5} & 0 & 1.0*10^{-3} & 0 \\ 0 & 5*10^{-5} & 0 & 1.0*10^{-3} \end{bmatrix},$$

and $x_0 = [0\ 0\ 1\ 0]^T$.

The measurement data is produced as $$y_k = Hx_k + v_k,\ \ v_k \sim N(0, R_k)$$

$$\text{where } H = \begin{bmatrix} 1 & 0 & 0 & 0 \\ 0 & 1 & 0 & 0 \end{bmatrix}, \text{ and } R_k = \begin{bmatrix} 0.1 & 0 \\ 0 & 0.1 \end{bmatrix}.$$

A simulation run using the above set of equations produces a sequence of states and a sequence of measurements. Each sequence contains 400 data points. Repeated simulation runs produce multiple sequences. For collecting filter performance statistics, 200 Monte-Carlo runs were conducted. Root Mean Square Error (RMSE) for filter performance are calculated based on the results obtained from 200 runs for each filter.

For the Linear Kalman filter with states of position and velocity (KF1), the state vector, measurement vector, system equation, measurement equation, and initial states used for simulation are listed in Table 18.

TABLE 18

| Entity | Description | | |
|---|---|---|---|
| States | $x_k = [x_k^1\ x_k^2\ x_k^3\ x_k^4]^T$ | | |
| Measurements | $y_k = [y_k^1\ y_k^2]^T$ | | |
| System equation | $x_k = Fx_{k-1}$ | $F = \begin{bmatrix} 1 & 0 & 0.1 & 0 \\ 0 & 1 & 0 & 0.1 \\ 0 & 0 & 1 & 0 \\ 0 & 0 & 0 & 1 \end{bmatrix}$ | |
| Measurement equation | $y_k = H_k x_k + v_k$, $v_k \sim N(0, R_k)$ | $H = \begin{bmatrix} 1 & 0 & 0 & 0 \\ 0 & 1 & 0 & 0 \end{bmatrix}$ | $R_k = \begin{bmatrix} 0.1 & 0 \\ 0 & 0.1 \end{bmatrix}$ |
| Initial State | $x_0 = [y_0^1\ y_0^2\ 0\ 0]^T$ | | |
| Initial Covariance | $P_0 = diag(0.1, 0.1, 0.1, 0.1)$ | | |

For the Linear Kalman filter with states of position, velocity, and acceleration (KF2), the state vector, measurement vector, system equation, measurement equation, and initial states used for simulation are listed in Table 19.

TABLE 19

| Entity | Description |
|---|---|
| States Measurements | $x_k = [x_k^1 \ x_k^2 \ x_k^3 \ x_k^4 \ x_k^5 \ x_k^6]^T$ $y_k = [y_k^1 \ y_k^2]^T$ |
| System equation | $x_k = Fx_{k-1}$ $F = \begin{bmatrix} 1 & 0 & 0.1 & 0 & 0.05 & 0 \\ 0 & 1 & 0 & 0.1 & 0 & 0.05 \\ 0 & 0 & 1 & 0 & 0.1 & 0 \\ 0 & 0 & 0 & 1 & 0 & 0.1 \\ 0 & 0 & 0 & 0 & 1 & 0 \\ 0 & 0 & 0 & 0 & 0 & 1 \end{bmatrix}$ |
| Measurement equation | $y_k = H_k x_k + v_k$, $v_k \sim N(0, R_k)$ $H = \begin{bmatrix} 1 & 0 & 0 & 0 & 0 & 0 \\ 0 & 1 & 0 & 0 & 0 & 0 \end{bmatrix}$ $R_k = \begin{bmatrix} 0.1 & 0 \\ 0 & 0.1 \end{bmatrix}$ |
| Initial State | $x_0 = [y_0^1 \ y_0^2 \ 0 \ 0 \ 0 \ 0]^T$ |
| Initial Covariance | $P_0 = \text{diag}(0.1, 0.1, 0.1, 0.1, 0.5, 0.5)$ |

The KIMM filter used for simulation includes two modes (KF1+KF2) The probabilities and the initial values are described in Table 20.

TABLE 20

| Entity | Description |
|---|---|
| Transition probability | $P_{tr} = \begin{bmatrix} p_{tr}(0,0) & p_{tr}(0,1) \\ p_{tr}(1,0) & p_{tr}(1,1) \end{bmatrix}$, $p_{tr}(i,j)$ is the probability of transition from mode i to mode j. |
| Mode probability | $\mu_{k-1} = [\mu_{k-1}(1) \ \mu_{k-1}(2)]$, $\mu_{k-1}(i)$ is the probability of mode i |
| Initial transition probability | $P_{tr} = \begin{bmatrix} 0.7 & 0.3 \\ 0.3 & 0.7 \end{bmatrix}$ |
| Initial mode probability | $\mu_{k-1} = [0.5 \ 0.5]$ |

For the particle filter with states of position and velocity (PF1), the state vector, measurement vector, system equation, measurement equation, and initial states used for simulation are listed in Table 21.

TABLE 21

| Entity | Description |
|---|---|
| States Measurement | $x_k = [x_k^1 \ x_k^2 \ x_k^3 \ x_k^4]T$ $y_k = [y_k^1 \ y_k^2]T$ |
| System equation | $x_k = Fx_{k-1} + 20 * w_k$, $w_k \sim N(0, Q_k)$ $F = \begin{bmatrix} 1 & 0 & dt & 0 \\ 0 & 1 & 0 & dt \\ 0 & 0 & 1 & 0 \\ 0 & 0 & 0 & 1 \end{bmatrix}$, $Q_k = \begin{bmatrix} 3.33*10^{-6} & 0 & 5*10^{-5} & 0 \\ 0 & 3.33*10^{-6} & 0 & 5*10*^{-5} \\ 5*10^{-5} & 0 & 1.0*10^{-3} & 0 \\ 0 & 5*10^{-5} & 0 & 1.0*10^{-3} \end{bmatrix}$ $dt = 0.1$ |
| Measurement equation | $y_k = H_k x_k + v_k$, $v_k \sim N(0, R_k)$ $H = \begin{bmatrix} 1 & 0 & 0 & 0 \\ 0 & 1 & 0 & 0 \end{bmatrix}$ $R_k = \begin{bmatrix} 0.1 & 0 \\ 0 & 0.1 \end{bmatrix}$ |
| Number of particles | 1000 |
| Initial State | $x_0 = [y_0^1 \ y_0^2 \ 0 \ 0 \ 0 \ 0]^T$ |
| Initial particles | $\text{particle}_p = x_0 + u_0$, $u_0 \sim N(0, I)$ |

For the particle filter with states of position and velocity (PF2), the state vector, measurement vector, system equation, measurement equation, and initial states used for simulation are listed in Table 22.

TABLE 22

| Entity | Description |
|---|---|
| States Msrmnts | $x_k = [x_k^1 \ x_k^2 \ x_k^3 \ x_k^4 \ x_k^5 \ x_k^6]^T$ $y_k = [y_k^1 \ y_k^2]^T$ |
| System equation | $x_k = Fx_{k-1} + 20 * w_k$, $w_k \sim N(0, Q_k)$ $F = \begin{bmatrix} 1 & 0 & dt & 0 & 0.05 & 0 \\ 0 & 1 & 0 & dt & 0 & 0.05 \\ 0 & 0 & 1 & 0 & dt & 0 \\ 0 & 0 & 0 & 1 & 0 & dt \\ 0 & 0 & 0 & 0 & 1 & 0 \\ 0 & 0 & 0 & 0 & 0 & 1 \end{bmatrix}$, $Q_k = \begin{bmatrix} 5*10^{-7} & 0 & 1.25*10^{-5} & 0 & 1.67*10^{-4} & 0 \\ 0 & 5*10^{-7} & 0 & 1.25*10^{-5} & 0 & 1.67*10^{-4} \\ 1.25*10^{-5} & 0 & 3.33*10^{-4} & 0 & 0.005 & 0 \\ 0 & 1.25*10^{-5} & 0 & 3.33*10^{-4} & 0 & 0.005 \\ 1.67*10^{-4} & 0 & 0.005 & 0 & 0.1 & 0 \\ 0 & 1.67*10^{-4} & 0 & 0.005 & 0 & 0.1 \end{bmatrix}$ $dt = 0.1$ |

TABLE 22-continued

| Entity | Description |
|---|---|
| Measurement equation | $y_k = H_k x_k + v_k$, $v_k \sim N(0, R_k)$    $H = \begin{bmatrix} 1 & 0 & 0 & 0 & 0 & 0 \\ 0 & 1 & 0 & 0 & 0 & 0 \end{bmatrix}$    $R_k = \begin{bmatrix} 0.1 & 0 \\ 0 & 0.1 \end{bmatrix}$ |
| Number of particles | 1000 |
| Initial State | $x_0 = [y_0^1 \; y_0^2 \; 0 \; 0 \; 0 \; 0]^T$ |
| Initial particles | $\text{particle}_p = x_0 + u_0$, $u_0 \sim N(0, I)$ |

The PIMM filter used for simulation includes two modes PF1+PF2. The PIMM only probabilities and initial values are described in Table 23.

TABLE 23

| Entity | Description |
|---|---|
| Transition probability | $P_{tr} = \begin{bmatrix} p_{tr}(0,0) & p_{tr}(0,1) \\ p_{tr}(1,0) & p_{tr}(1,1) \end{bmatrix}$, $p_{tr}(i, j)$ is the probability of transition from mode i to mode j. |
| Mode probability | $\mu_{k-1} = [\mu_{k-1}(1) \; \mu_{k-1}(2)]$, $\mu_{k-1}(i)$ is the probability of mode i. |
| Initial transition probability | $P_{tr} = \begin{bmatrix} 0.7 & 0.3 \\ 0.3 & 0.7 \end{bmatrix}$ |
| Initial mode probability | $\mu_{k-1} = [0.5 \; 0.5]$ |

In order to get a statistically meaningful comparison of the state estimations by four different filters, runs were performed. Each run used a new set of simulated measurements using the same reference system states. RMSE was used to measure the performance of a filter. The RMSE of the results of each filter was calculated, resulting in 200 individual RMSEs for each filter.

For a given filter, let $(x_k^p, y_k^p)$ be the estimated position at time k, and run p. Assume that there are K data points in each run, and a total of P runs. The ground truth is generated by the simulated states $(\bar{x}_k, \bar{y}_k)$. The RMSE over all data points for run p was calculated as $$RMSE^p = \left\{ \frac{1}{K} \sum_{k=1}^{K} [(x_x^p - \bar{x}_k)^2 + (y_k^p - \bar{y}_k)^2] \right\}^{1/2}.$$

The RMSE over all runs was calculated as $$RMSE = \frac{1}{P} \sum_{p=1}^{P} RMSE^p.$$

The overall RMSE for a filter was calculated by averaging its 200 RMSEs (P=200) and are shown Table 24.

TABLE 24

|  | Filter | | | | | |
|---|---|---|---|---|---|---|
|  | KF1 | KF2 | KIMM | PF1 | PF2 | PIMM |
| RMSE (m) | 1.22251 | 1.74669 | 1.34080 | 2.01316 | 2.8408 | 2.24294 |

Based on the RMSE in Table 24, all four filters have exhibited similar good tracking performance in the "constant velocity" scenario. KF2's lower performance is likely due to its constant acceleration system model.

Figures 11A, 11B:
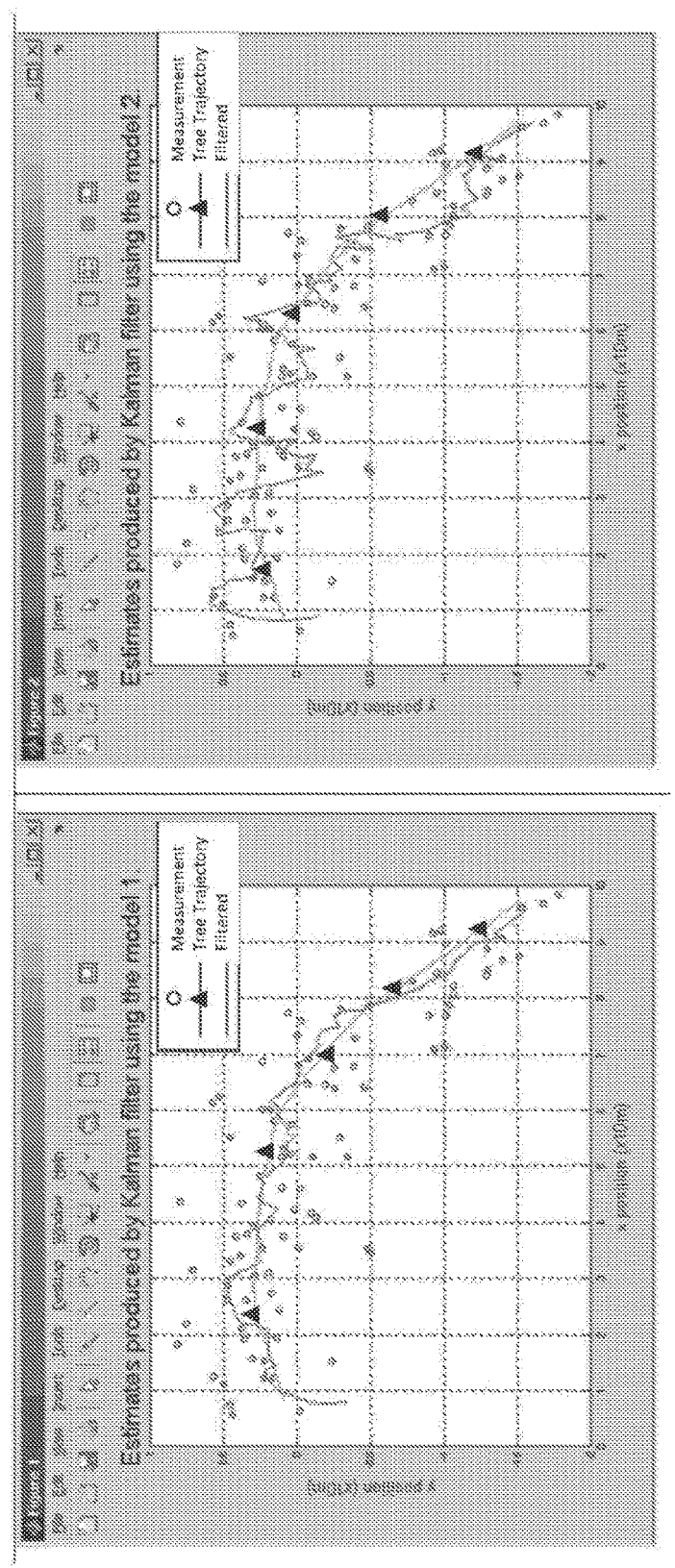
FIGS. 11A-11F are the plotted tracking results of multiple proposed filters in a sample individual run supporting operation of an Anti-Submarine Warfare (ASW) Continuous Trail Unmanned Vessels (ACTUV) in accordance with one or more embodiments herein.
Figure 11D:
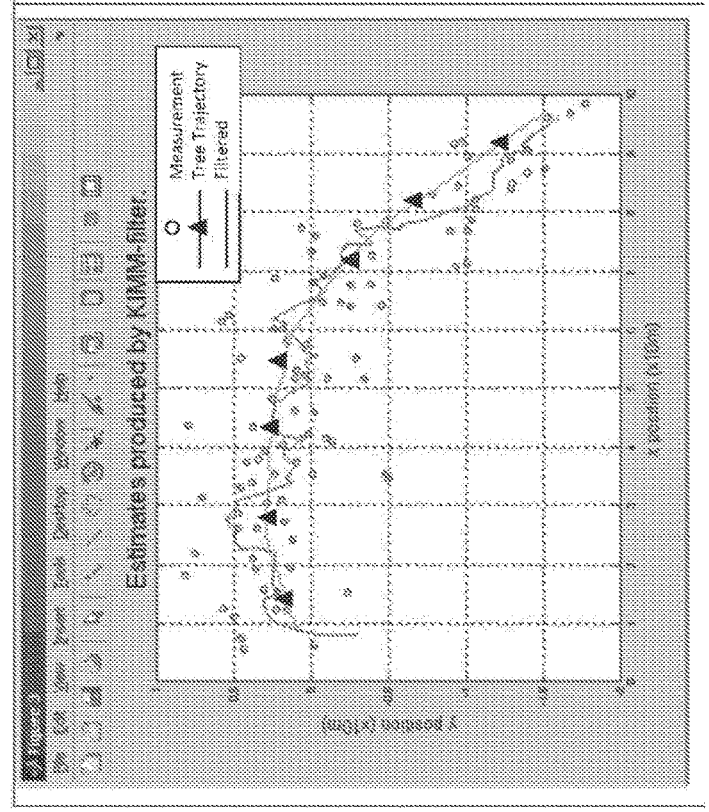
Figure 11C:
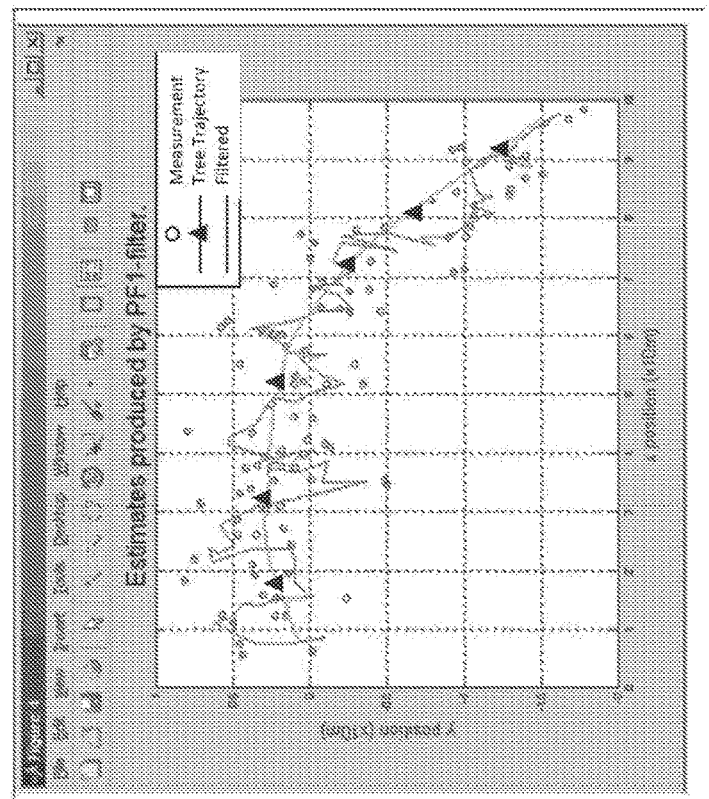
Figure 11F:
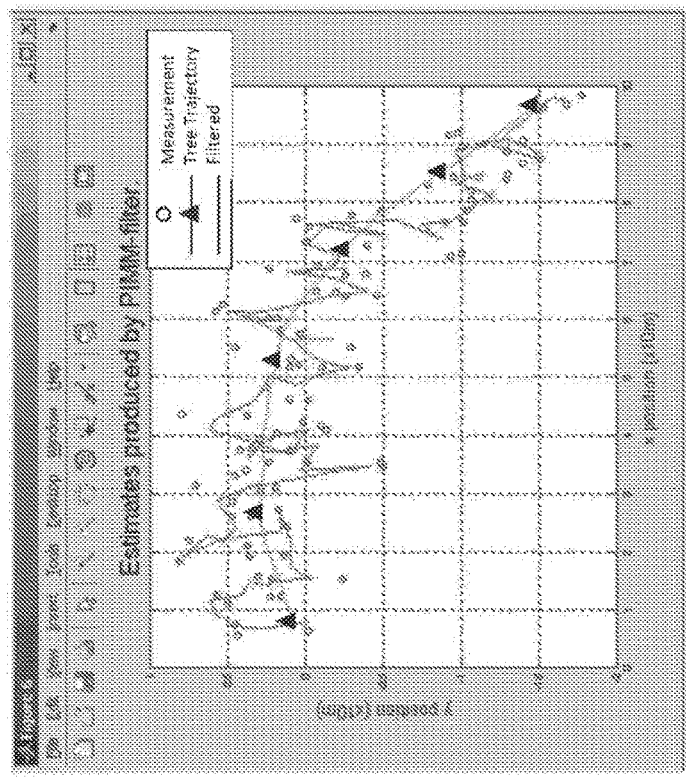
Figure 11E:
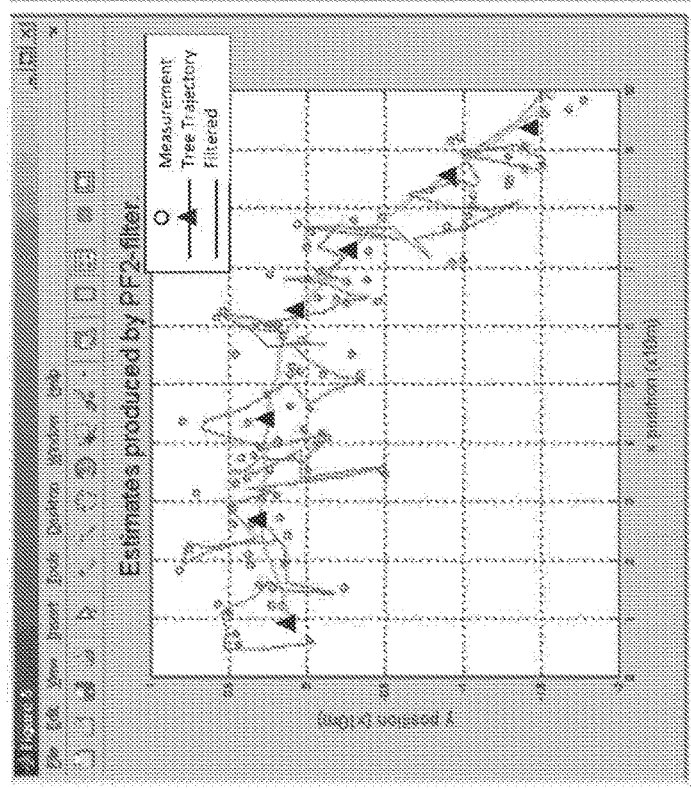

The tracking results of each filter in a sample individual run are plotted in FIGS. 11A through 11F. More particularly FIG. 11A plots KF1, FIG. 11B plots KF2, FIG. 11C plots KIMM, FIG. 11D plots PF1, FIG. 11E plots PF2, and FIG. 11F plots PIMM. For viewing, each plot only contains the data points indexed from 10 to 100.

The same six filter configurations described above are implemented for scenario 2, i.e., constant acceleration. The input to each tracking filter is a set of simulated measurement data, which is generated as described below. The reference system states for generating the measurement data in this case are $$x_k = [x_k^1 \; x_k^2 \; x_k^3 \; x_k^4 \; x_k^5 \; x_k^6]^T,$$

where k is the time, and $x_k^1, x_k^2, \ldots, x_k^6$ are the position in x, y, velocity in x and y, and acceleration in x, y directions.

The state sequence was produced according to the following system equation, $$x_k = F x_{k-1} + w_k, \quad w_k \sim N(0, Q_k)$$

$$\text{where} = \begin{bmatrix} 1 & 0 & 0.1 & 0 & 0.05 & 0 \\ 0 & 1 & 0 & 0.1 & 0 & 0.05 \\ 0 & 0 & 1 & 0 & 0.1 & 0 \\ 0 & 0 & 0 & 1 & 0 & 0.1 \\ 0 & 0 & 0 & 0 & 1 & 0 \\ 0 & 0 & 0 & 0 & 0 & 1 \end{bmatrix},$$

-continued $$Q_k = \begin{bmatrix} 5*10^{-7} & 0 & 1.25*10^{-5} & 0 & 1.67*10^{-4} & 0 \\ 0 & 5*10^{-7} & 0 & 1.25*10^{-5} & 0 & 1.67*10^{-4} \\ 1.25*10^{-5} & 0 & 3.33*10^{-4} & 0 & 0.005 & 0 \\ 0 & 1.25*10^{-5} & 0 & 3.33*10^{-4} & 0 & 0.005 \\ 1.67*10^{-4} & 0 & 0.005 & 0 & 0.1 & 0 \\ 0 & 1.67*10^{-4} & 0 & 0.005 & 0 & 0.1 \end{bmatrix}$$

and $x_0 = [0\ 0\ 1\ 0\ 1\ 0]^T$.

The measurement data was produced as $$y_k = Hx_k + v_k, \quad v_k \sim N(0, R_k)$$

where $H = \begin{bmatrix} 1 & 0 & 0 & 0 & 0 & 0 \\ 0 & 1 & 0 & 0 & 0 & 0 \end{bmatrix}$, and $R_k = \begin{bmatrix} 0.1 & 0 \\ 0 & 0.1 \end{bmatrix}$.

The number of data points and number of sequences produced were the same as that described with respect to scenario 1 above.

Each of the six filters used for this scenario is configured in the same way as those in table 18. Two hundred (200) runs of each filter produced the following average RMSEs in Table 25.

TABLE 25

| | Filter | | | | | |
|---|---|---|---|---|---|---|
| | KF1 | KF2 | KIMM | PF1 | PF2 | PIMM |
| RMSE (m) | 38.38825 | 1.87635 | 8.88783 | 4.78705 | 2.81135 | 2.65649 |

Based on the RMSE in Table 25, KF1's tracking performance appears to be the worst, while the rest of the filters show good performance as expected. KF1's and PF1's system function is modeled for constant velocity, while that of KF2 and PF2 are modeled for constant acceleration. KIMM exhibits poorer performance than that of KF2 and the particle filters, albeit still respectable. Interestingly, PF1 performs significantly better than KF1 does in this scenario even though both filters have 4 states (no acceleration states). As a result, the PIMM filter significantly outperforms the KIMM filter.

Figure 12B:
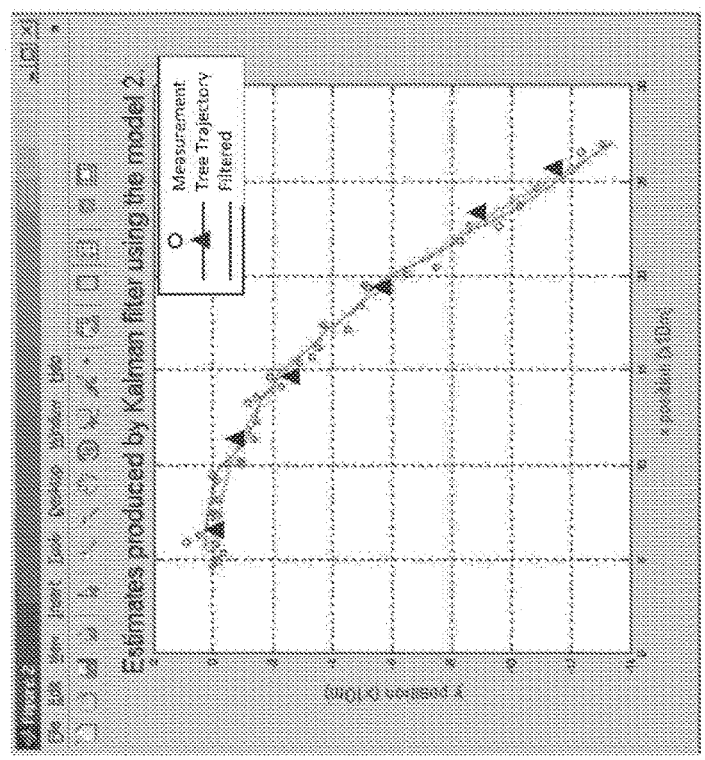
FIGS. 12A-12F are the plotted tracking results of multiple proposed filters in a sample individual run supporting operation of an Anti-Submarine Warfare (ASW) Continuous Trail Unmanned Vessels (ACTUV) in accordance with one or more embodiments herein.
Figure 12A:
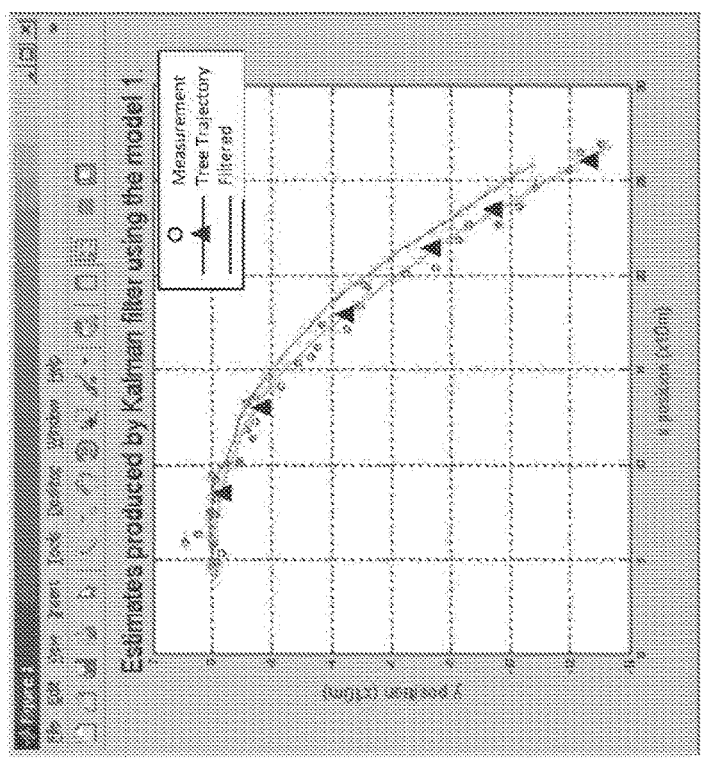
Figure 12D:
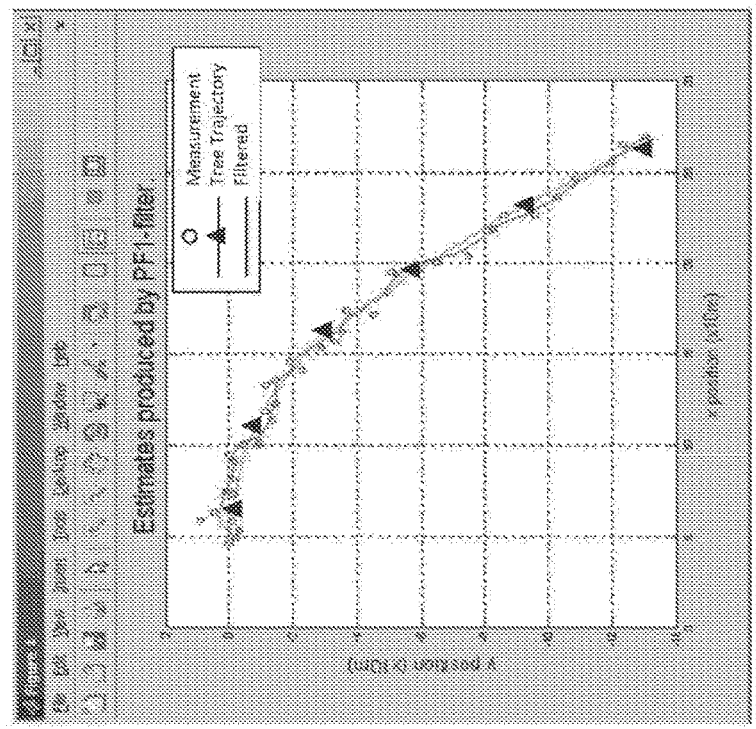
Figure 12C:
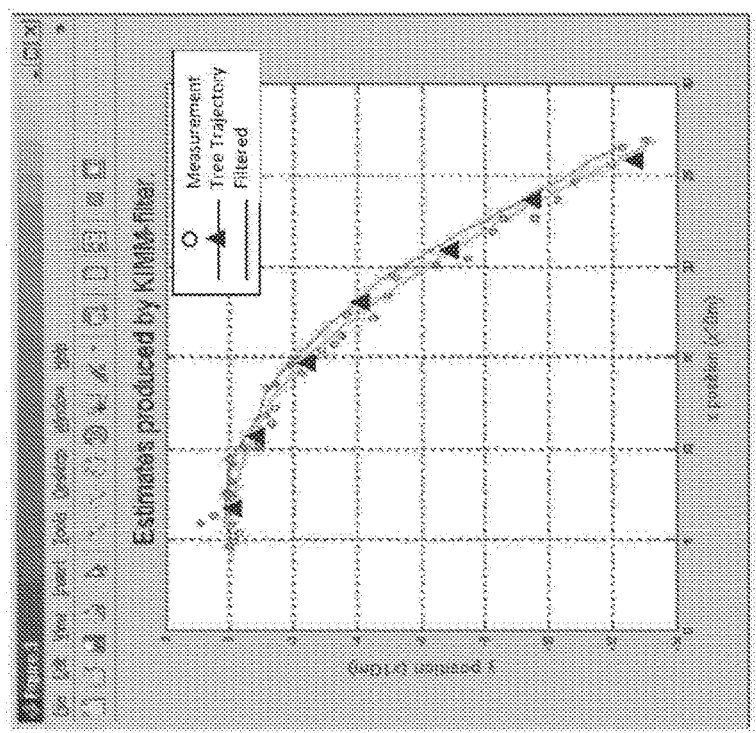
Figure 12F:
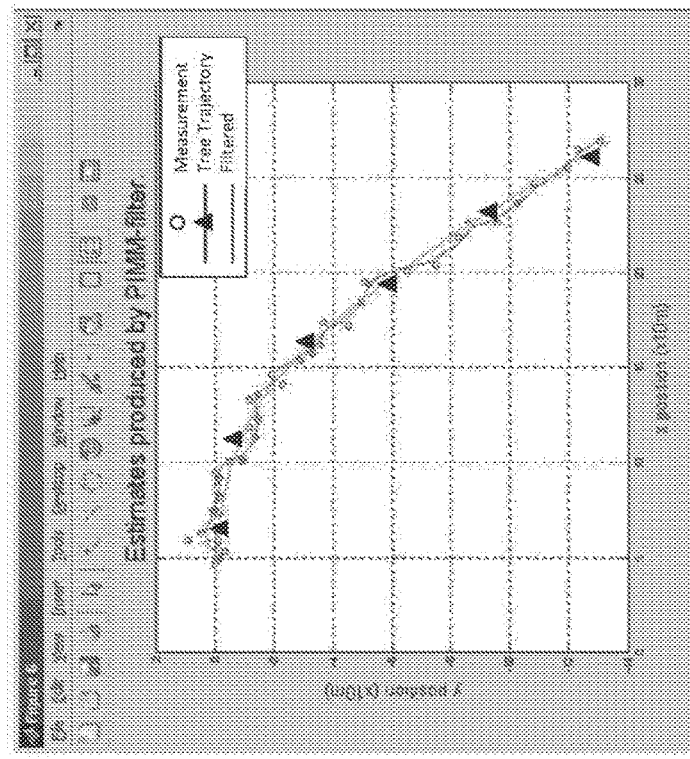
Figure 12E:
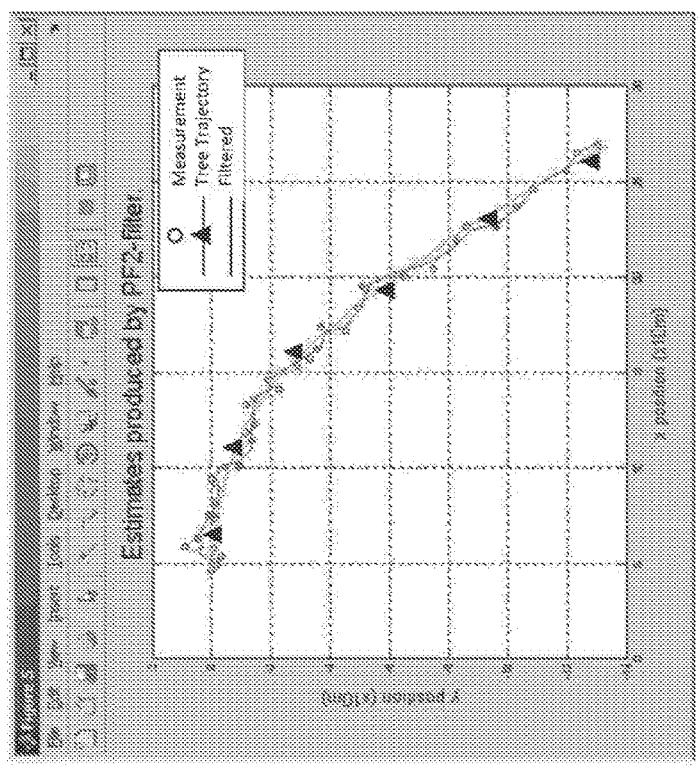

The tracking results of each filter in a sample individual run are plotted in FIGS. 12A through 12F. More particularly FIG. 12A plots KF1, FIG. 12B plots KF2, FIG. 12C plots KIMM, FIG. 12D plots PF1, FIG. 12E plots PF2, and FIG. 12F plots PIMM. For viewing, each plot only contains the data points indexed from 21 to 60.

In case of mixed modes of constant velocity and constant acceleration, the same six filter configurations as those in previous sections were compared. The input to each tracking filter is a set of simulated measurement data, which is generated as described below. The measurement data set for scenario 3 includes two modes: constant velocity and constant acceleration. A total of 400 data points were generated for scenario 3. The first 200 data points were generated using the constant velocity mode, and the second 200 data points are generated using the constant acceleration mode.

All six filters used in this scenario have the same configurations as those in previous scenarios. Two hundred runs of each filter produced the following average RMSEs in Table 26.

TABLE 26

| | Filter | | | | | |
|---|---|---|---|---|---|---|
| | KF1 | KF2 | KIMM | PF1 | PF2 | PIMM |
| RMSE (m) | 18.90571 | 1.80542 | 3.38333 | 2.55946 | 2.81188 | 2.34298 |

Table 26 shows that KF2, K IMM, PF1, PF2, and PIMM performed well. KF1 performs poorly as it is a single model solution modeled for constant velocity.

Figure 13B:
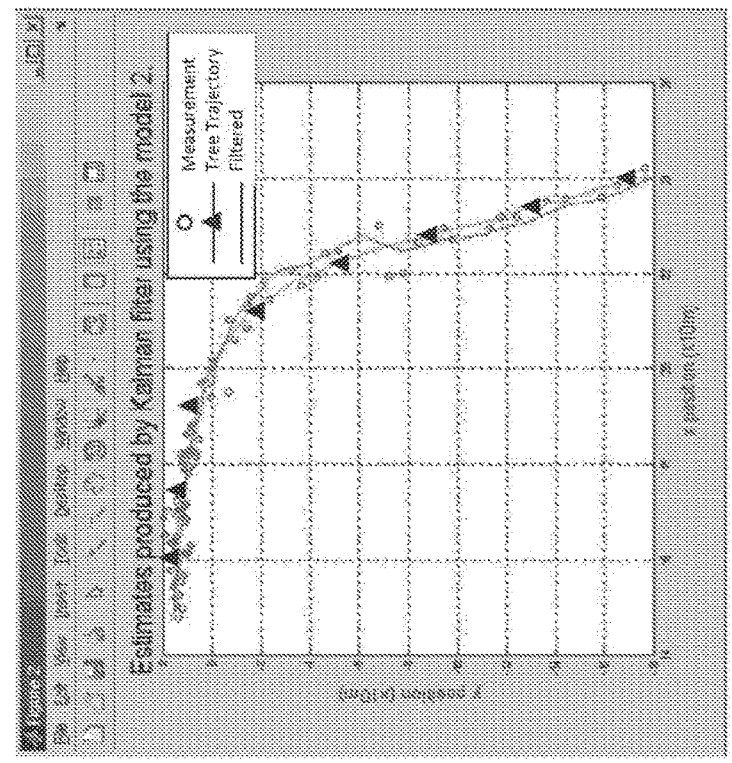
FIGS. 13A-13F are the plotted tracking results of multiple proposed filters in a sample individual run supporting operation of an Anti-Submarine Warfare (ASW) Continuous Trail Unmanned Vessels (ACTUV) in accordance with one or more embodiments herein.
Figure 13A:
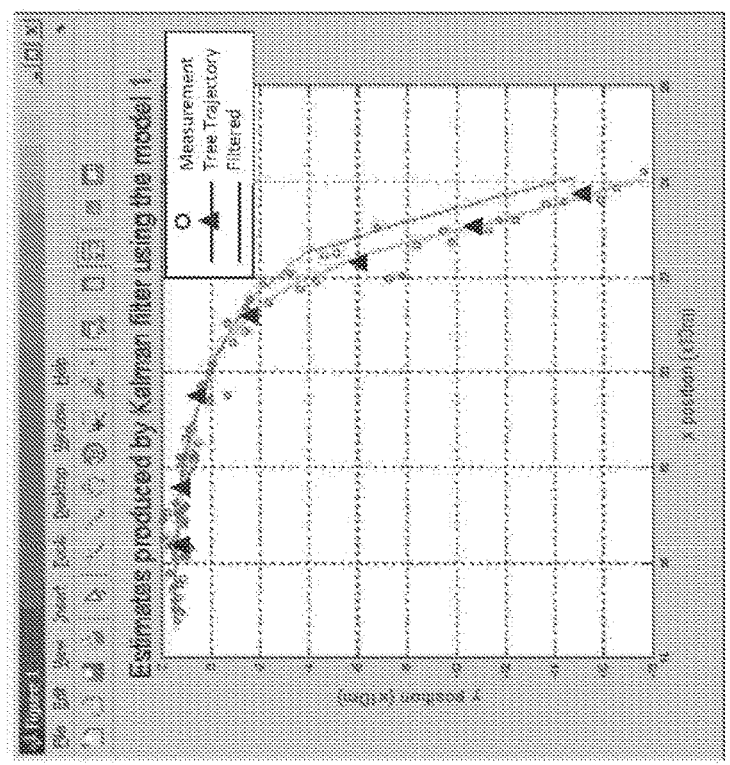
Figure 13D:
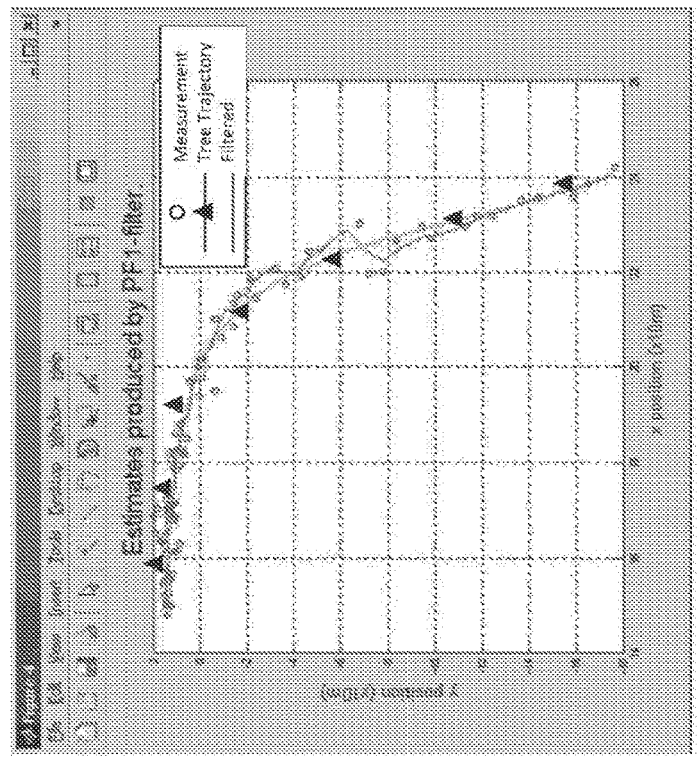
Figure 13C:
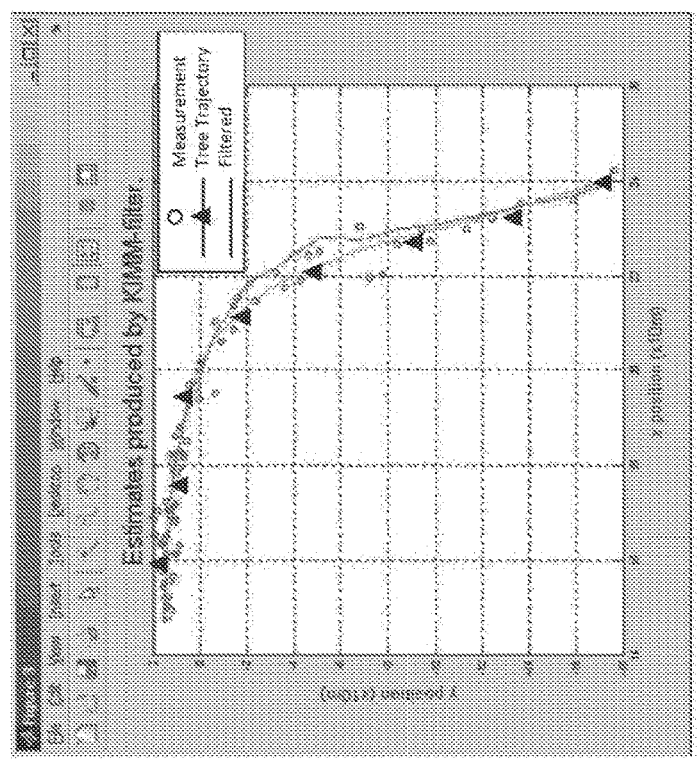
Figure 13F:
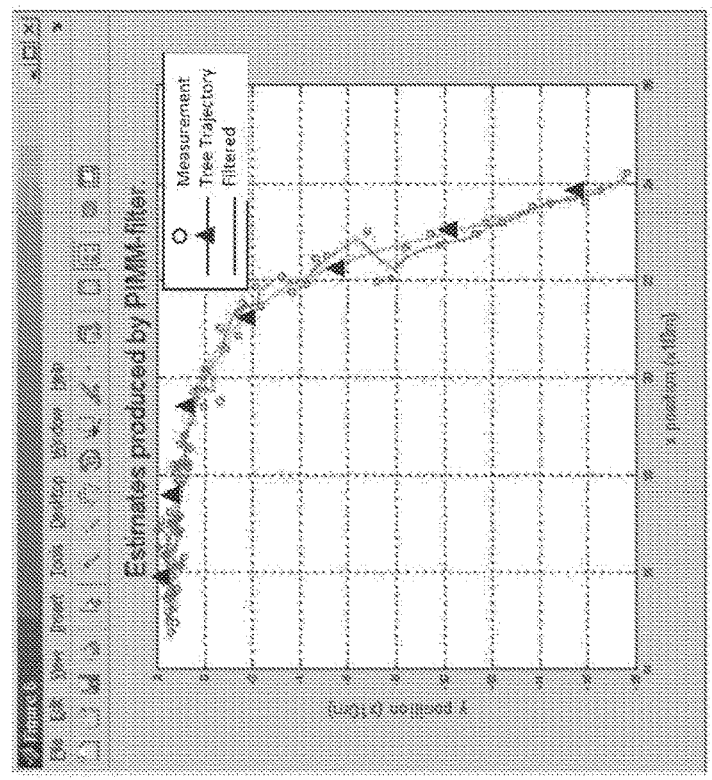
Figure 13E:
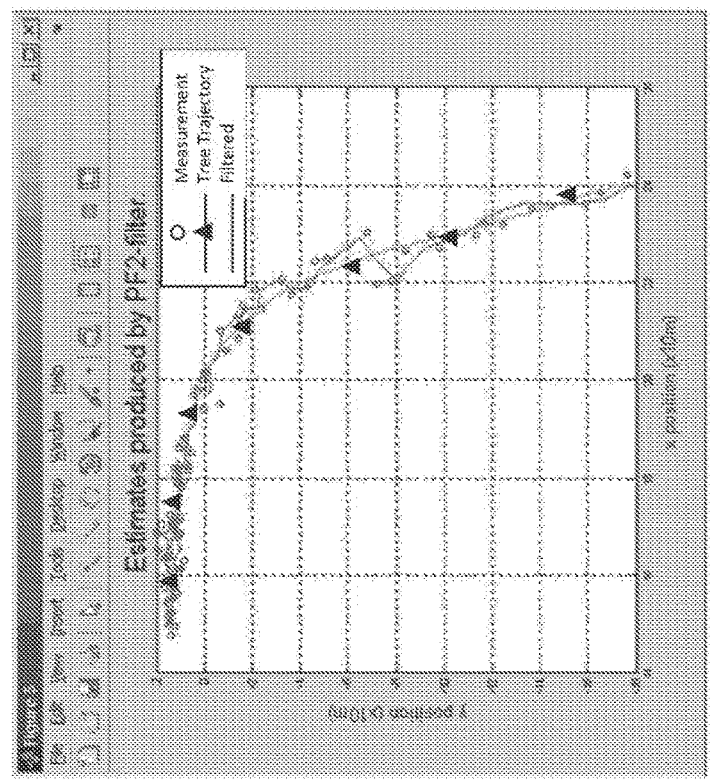

The tracking results of each filter in a sample individual run are plotted in FIGS. 13A through 13F. More particularly FIG. 13A plots KF1, FIG. 13B plots KF2, FIG. 13C plots KIMM, FIG. 13D plots PF1, FIG. 13E plots PF2, and FIG. 13F plots PIMM. For viewing, each plot only contains the data points indexed from 161 to 240. Note that data points indexed from 1-200 are in "constant velocity", and data points indexed from 201-400 are in "constant acceleration".

For the final scenario 4 the following filters are compared:
a. Linear Kalman filter (KF1) with a system function of states: position and velocity;
b. Extended Kalman filter (EKF) with a system function of states: position, velocity, and turning rate;
c. Unscented Kalman filter (UKF) with a system function of states: position, velocity, and turning rate;
d. IMM filter of two modes (EIMM): linear Kalman filter in a, and extended Kalman filter in b;
e. IMM filter of two modes (UIMM): linear Kalman filter in a, and unscented Kalman filter in c;
f. Particle filter (PF1) with a system function of states: position and velocity.
g. Particle filter (PF3) with 5 states: position, velocity, and turn rate.
h. IMM filter of two modes (PIMM2): filter in f, and filter in g.

The input to each tracking filter is a set of simulated measurement data, which is generated as described below. The measurement data set for the case of a mixture of linear (constant velocity) and maneuvering includes two modes. The measurement data generation for each mode is described below.

For constant velocity mode, the reference system states for generating the measurement data in this case is $$x_k = [x_k^1\ x_k^2\ x_k^3\ x_k^4]^T,$$

where k is the time, and $x_k^1$, $x_k^2$, $x_k^3$, $x_k^4$ are the position in x, y, and velocity in x and y directions.

The state sequence is produced according to the following system equation, $$x_k = Fx_{k-1},$$

where $= \begin{bmatrix} 1 & 0 & 0.1 & 0 \\ 0 & 1 & 0 & 0.1 \\ 0 & 0 & 1 & 0 \\ 0 & 0 & 0 & 1 \end{bmatrix}$, and $x_0 = [0\ 0\ 1\ 0]^T$.

The measurement data is produced as $$y_k = Hx_k + v_k,\quad v_k \sim N(0, R_k)$$

where $H = \begin{bmatrix} 1 & 0 & 0 & 0 \\ 0 & 1 & 0 & 0 \end{bmatrix}$, and $R_k = \begin{bmatrix} 0.5 & 0 \\ 0 & 0.5 \end{bmatrix}$.

For the maneuvering mode, the system states for generating the measurement data in this case is $$x_k = [x_k^1\ x_k^2\ x_k^3\ x_k^4\ x_k^5]^T,$$

where k is the time, and $x_k^1, x_k^2, \ldots, x_k^5$ are the position in x, y, and velocity in x and y directions, and the turn rate. The turn rate tr is defined as the turning angle, $\theta$, in radians, during a single time step. In other words, the turning angle $\theta$ is the product of turn rate and the time duration, $$\theta = tr*dt.$$

The state sequence is produced according to the following system equation, $$x_k = F_k x_{k-1},$$

where $F_k = \begin{bmatrix} 1 & 0 & \sin(\theta)/x_k^5 & \cos(\theta)/x_k^5 & 0 \\ 0 & 1 & -\cos(\theta)/x_k^5 & \sin(\theta)/x_k^5 & 0 \\ 0 & 0 & \cos(\theta) & -\sin(\theta) & 0 \\ 0 & 0 & \sin(\theta) & \cos(\theta) & 0 \\ 0 & 0 & 0 & 0 & 1 \end{bmatrix}$, when $x_k^5 \neq 0$ and $F_k = \begin{bmatrix} 1 & 0 & dt & 0 & 0 \\ 0 & 1 & 0 & dt & 0 \\ 0 & 0 & \cos(\theta) & -\sin(\theta) & 0 \\ 0 & 0 & \sin(\theta) & \cos(\theta) & 0 \\ 0 & 0 & 0 & 0 & 1 \end{bmatrix}$, when $x_k^5 = 0$ $\theta = x_k^5 * dt$, and $x_0 = [0\ 0\ 1\ 0\ 1]^T$.

The measurement data is produced as $$y_k = Hx_k + v_k,\ v_k \sim N(0, R_k)$$

where $H = \begin{bmatrix} 1 & 0 & 0 & 0 & 0 \\ 0 & 1 & 0 & 0 & 0 \end{bmatrix}$, and $R_k = \begin{bmatrix} 0.5 & 0 \\ 0 & 0.5 \end{bmatrix}$.

Each sequence of states of the mixture modes was formed by generating the data points indexed from 1 to 250 using the constant velocity model, and the data points indexed from 251 to 400 using the maneuvering model. Each sequence of measurements is formed similarly. With the above configuration, a Monte Carlo simulation produced 200 state sequences and 200 corresponding measurement sequences.

The configurations for KF1 in this scenario are the same as that in previous scenarios. For the Extended Kalman filter with position, velocity, and acceleration (EKF), this is the mode-2 filter in the EIMM. It is an extended Kalman filter with five states and its system function was built according to a turn model as that used for data generation above. The EKF configurations are described in Table 27.

TABLE 27

| Entity | Description | |
|---|---|---|
| States | $x_k = [x_k^1\ x_k^2\ x_k^3\ x_k^4\ x_k^5]^T$ | |
| Measurements | $y_k = [y_k^1\ y_k^2]^T$ | |
| System equation | $x_k = F(x_{k-1}) + w_k$ $w_k \sim N(0, Q_k)$ | $F(x_{k-1})$ and its Jacobian are defined as f_turn and f_turn_dt, and can be found in EKF/UKF toolbox |
| Measurement equation | $y_k = H_k x_k + v_k,$ $v_k \sim N(0, R_k)$ | $H = \begin{bmatrix} 1 & 0 & 0 & 0 & 0 \\ 0 & 1 & 0 & 0 & 0 \end{bmatrix}$ $R_k = \begin{bmatrix} 0.1 & 0 \\ 0 & 0.1 \end{bmatrix}$ |
| Initial State | $x_0 = [0\ 0\ 1\ 0\ 0]^T$ | |
| Initial Covariance | $P_0 = \mathrm{diag}(0.1, 0.1, 0.1, 0.1, 1)$ | |

The IMM filter of extended Kalman filter (EIMM) has two modes: a 4-state linear Kalman filter with position and velocity (EKF1) and a 5-state EKF with position, velocity, and turn rate (EKF2). The IMM filter configurations are described in Table 28.

TABLE 28

| Entity | Description |
|---|---|
| Transition probability | $P_{tr} = \begin{bmatrix} p_{tr}(0,0) & p_{tr}(0,1) \\ p_{tr}(1,0) & p_{tr}(1,1) \end{bmatrix}$, $p_{tr}(i,j)$ is the probability of transition from mode i to mode j. |
| Mode probability | $\mu_{k-1} = [\mu_{k-1}(1)\ \mu_{k-1}(2)]$, $\mu_{k-1}(i)$ is the probability of mode i. |
| Initial transition probability | $P_{tr} = \begin{bmatrix} 0.7 & 0.3 \\ 0.3 & 0.7 \end{bmatrix}$, |
| Initial mode probability | $\mu_{k-1} = [0.6\ 0.4]$ |

Unscented Kalman filter with position, velocity, and turn rate (UKF2) is the mode 2 filter in the UIMM. It is an unscented Kalman filter with five states and its system function is built according to a turn model as that used above. The settings for UKF2 are described in Table 29.

TABLE 29

| Entity | Description | |
|---|---|---|
| States | $x_k = [x_k^1\ x_k^2\ x_k^3\ x_k^4\ x_k^5]^T$ | |
| Measurements | $y_k = [y_k^1\ y_k^2]^T$ | |
| System equation | $x_k = F(x_{k-1}) + w_k$ $w_k \sim N(0, Q_k)$ | $F(x_{k-1})$ is defined as f_turn and, and can be found in EKF/UKF toolbox |
| Measurement equation | $y_k = H_k x_k + v_k,$ $v_k \sim N(0, R_k)$ | $H = \begin{bmatrix} 1 & 0 & 0 & 0 & 0 \\ 0 & 1 & 0 & 0 & 0 \end{bmatrix}$ $R_k = \begin{bmatrix} 0.1 & 0 \\ 0 & 0.1 \end{bmatrix}$ |

TABLE 29-continued

| Entity | Description |
|---|---|
| Initial State | $x_0 = [0\ 0\ 1\ 0\ 0]^T$ |
| Initial Co-variance | $P_0 = \text{diag}(0.1, 0.1, 0.1, 0.1, 1)$ |

The IMM filter of unscented Kalman filter (UIMM) has two modes: a 4-state linear Kalman filter with position and velocity (KF1) and a 5-state unscented Kalman filter with position, velocity, and turn rate (UKF). The UIMM filter only configurations are the same as that described in Table 28.

For Particle filter (PF1), the state vector, measurement vector, system equation, measurement equation, and initial states used for simulation are listed in Table 30.

TABLE 30

| Entity | Description |
|---|---|
| States | $x_k = x_k = [x_k^1\ x_k^2\ x_k^3\ x_k^4]^T$ |
| Measurements | $y_k = [y_k^1\ y_k^2]^T$ |
| System equation | $x_k = Fx_{k-1} + B(u_k) + 20 * w_k$, $w_k \sim N(0, Q_k)$, $F = \begin{bmatrix} 1 & 0 & 0.1 & 0 \\ 0 & 1 & 0 & 0.1 \\ 0 & 0 & 1 & 0 \\ 0 & 0 & 0 & 1 \end{bmatrix}$, $u_k = k - 1$, $B(u_k) = 0.01 * \sin(0.25 * pi * u_k)$, $Q_k = \text{diag}(0.1, 0.1, 0.1, 0.1, 0.5, 0.5)$ |
| Measurement equation | $y_k = H_k x_k + v_k$, $v_k \sim N(0, R_k)$, $H = \begin{bmatrix} 1 & 0 & 0 & 0 \\ 0 & 1 & 0 & 0 \end{bmatrix}$, $R_k = \begin{bmatrix} 0.5 & 0 \\ 0 & 0.5 \end{bmatrix}$ |
| Number of particles | 1000 |
| Initial State | $x_0 = [y_0^1\ y_0^2\ 0\ 0]^T$ |
| Initial particles | $\text{particle}_p = x_0 + u_0$, $u_0 \sim N(0, I)$ |

For Particle filter with 5 states (PF3), the state vector, measurement vector, system equation, measurement equation, and initial states used for simulation are listed in Table 31.

TABLE 31

| Entity | Description |
|---|---|
| States | $x_k = [x_k^1\ x_k^2\ x_k^3\ x_k^4\ x_k^5]^T$ |
| Measurements | $y_k = [y_k^1\ y_k^2]^T$ |
| System equation | $x_k = F(x_{k-1}) + B(u_k) + 5.0 * w_k$, $w_k \sim N(0, Q_k)$, $F(x_{k-1})$ is defined as f turn, and can be found in EKF/UKF toolbox, $u_k = k - 1$, $B(u_k) = 0.01 * \sin(0.25 * pi * u_k)$, $Q_k = \text{diag}(0.1, 0.1, 0.1, 0.1, 0.5, 0.5)$ |
| Measurement equation | $y_k = H_k x_k + v_k$, $v_k \sim N(0, R_k)$, $H = \begin{bmatrix} 1 & 0 & 0 & 0 \\ 0 & 1 & 0 & 0 \end{bmatrix}$, $R_k = \begin{bmatrix} 0.5 & 0 \\ 0 & 0.5 \end{bmatrix}$ |
| Number of particles | 1000 |
| Initial State | $x_0 = [y_0^1\ y_0^2\ 0\ 0\ 0]^T$ |
| Initial particles | $\text{particle}_p = x_0 + u_0$, $u_0 \sim N(0, I)$ |

The IMM filter of particle filters (PIMM) has two modes: a 4-state linear particle filter with position and velocity (PF1) and a 5-state particle filter with position, velocity, and turn rate (PF3). The PIMM filter configurations are described in Table 32.

TABLE 32

| Entity | Description |
|---|---|
| Transition probability | $P_{tr} = \begin{bmatrix} p_{tr}(0, 0) & p_{tr}(0, 1) \\ p_{tr}(1, 0) & p_{tr}(1, 1) \end{bmatrix}$, $p_{tr}(i, j)$ is the probability of transition from mode i to mode j. |
| Mode probability | $\mu_{k-1} = [\mu_{k-1}(1)\ \mu_{k-1}(2)]$, $\mu_{k-1}(i)$ is the probability of mode i. |
| Initial transition probability | $P_{tr} = \begin{bmatrix} 0.7 & 0.3 \\ 0.3 & 0.7 \end{bmatrix}$ |
| Initial mode probability | $\mu_{k-1} = [0.6\ 0.4]$ |

Two hundred Monte Carlo runs of each filter produced the following average RMSEs in Table 33.

TABLE 33

| Entity | KF1 | EIMM | UIMM | PF1 | PIMM |
|---|---|---|---|---|---|
| RMSE | 3.995 | 5.122 | 5.106 | 3.785 | 3.904 |

Table 33 shows that all five filters exhibit good performance in the constant velocity and maneuvering mixed modes scenario for the data generation configurations specified above. However, the particle filters perform better than Kalman filters.

Figure 14B:
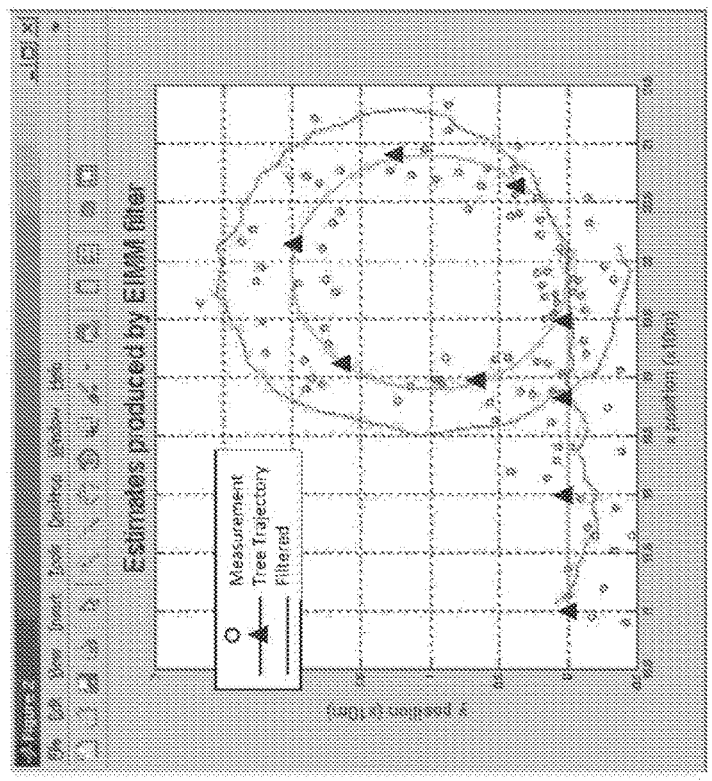
FIGS. 14A-14F are the plotted tracking results of multiple proposed filters in a sample individual run supporting operation of an Anti-Submarine Warfare (ASW) Continuous Trail Unmanned Vessels (ACTUV) in accordance with one or more embodiments herein; and 15A-15E are plots of the Root Mean Square Error (RMSE) values of tracking results of multiple proposed filters in a sample individual run supporting operation of an Anti-Submarine Warfare (ASW) Continuous Trail Unmanned Vessels (ACTUV) in accordance with one or more embodiments herein.
Figure 14A:
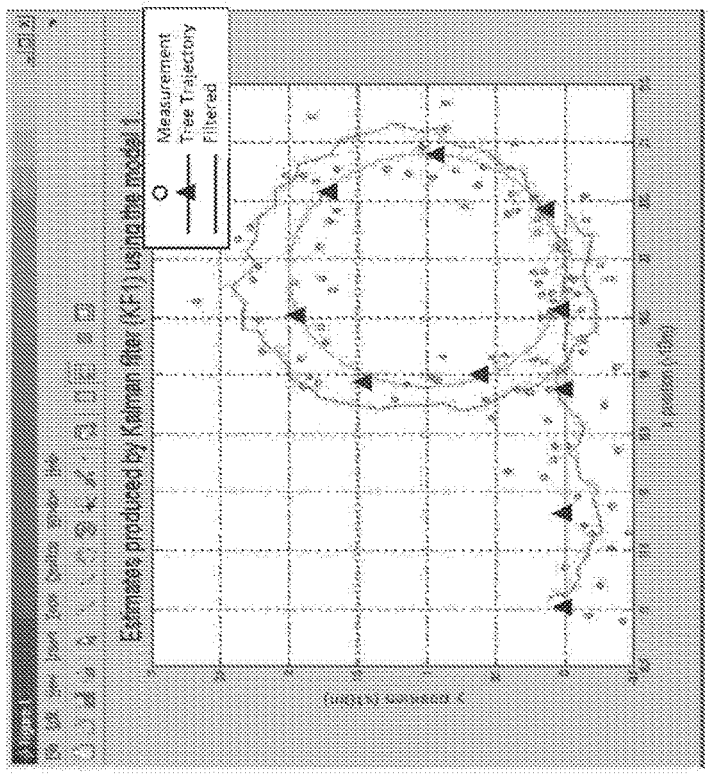
Figure 14D:
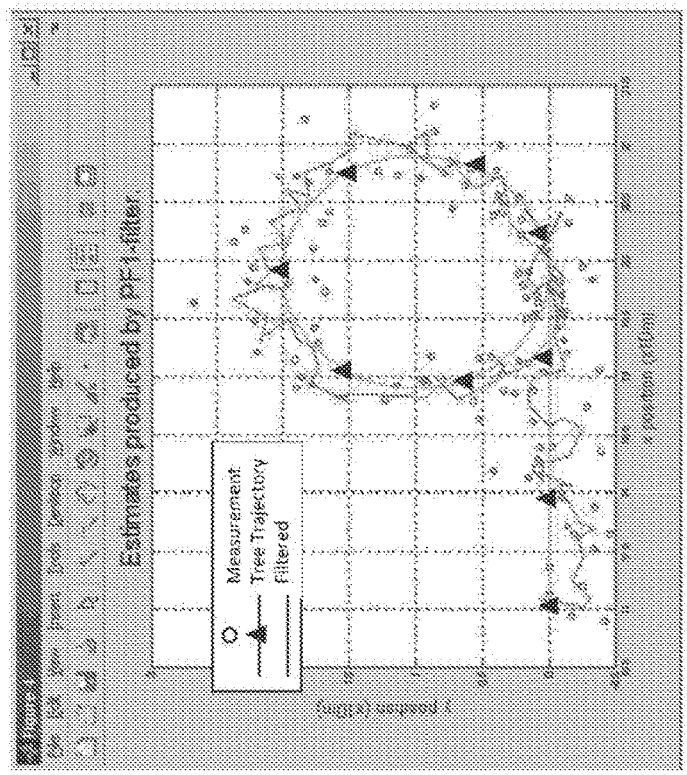
Figure 14C:
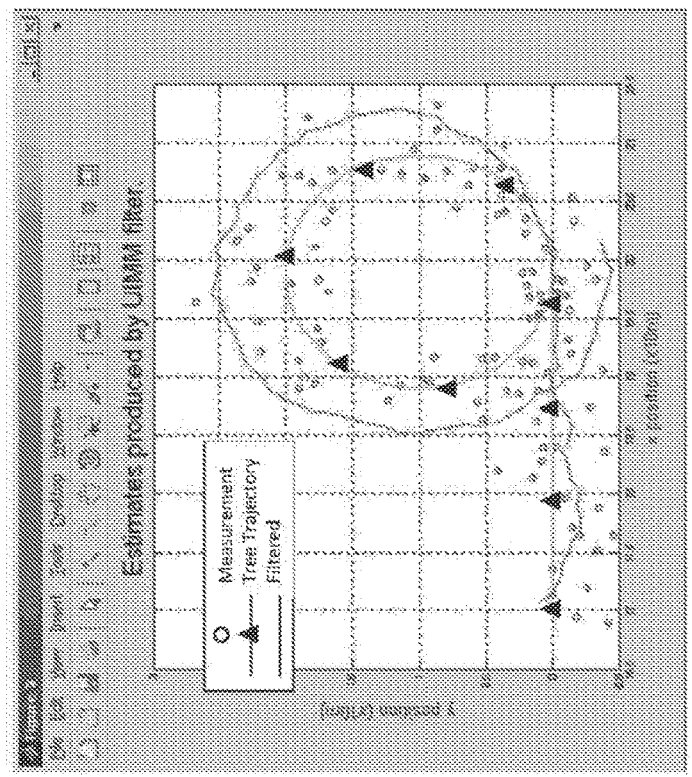
Figure 14F:
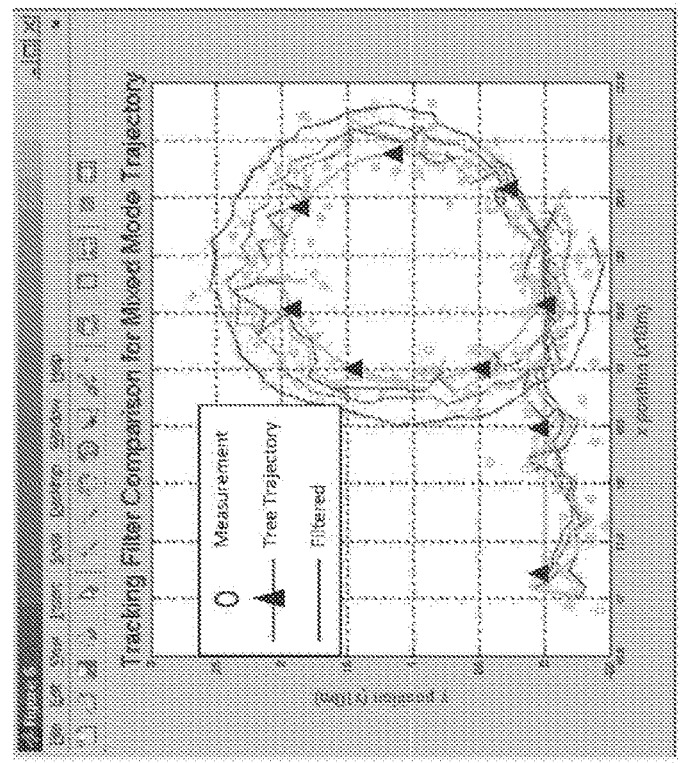
Figure 14E:
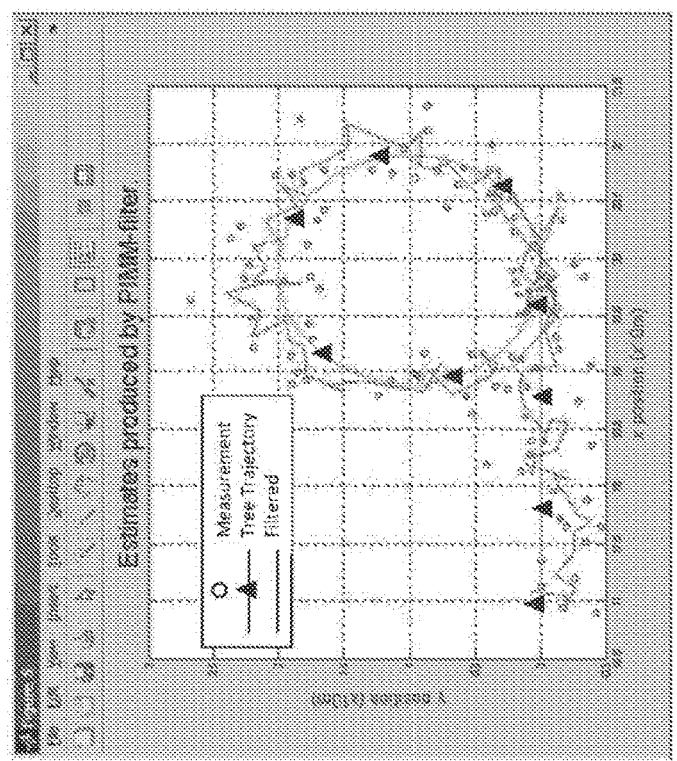
Figure 15A:
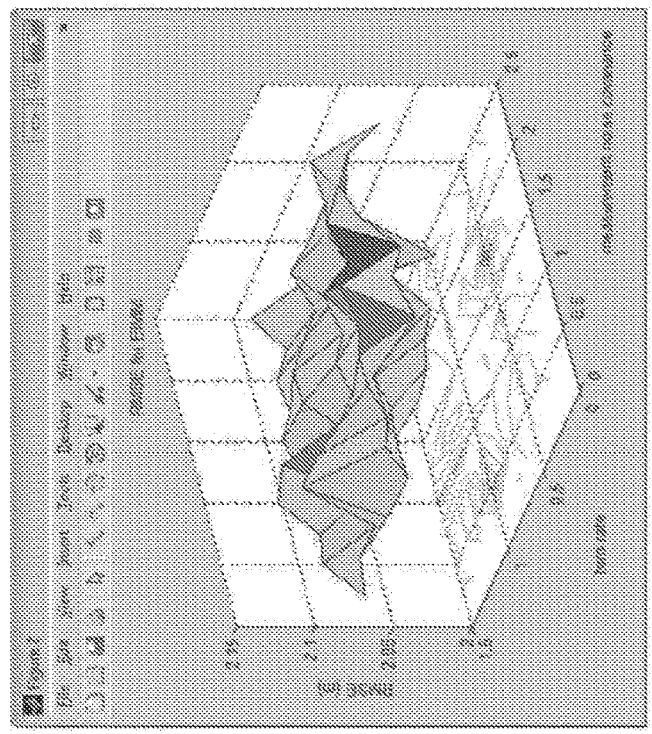
Figure 15B:
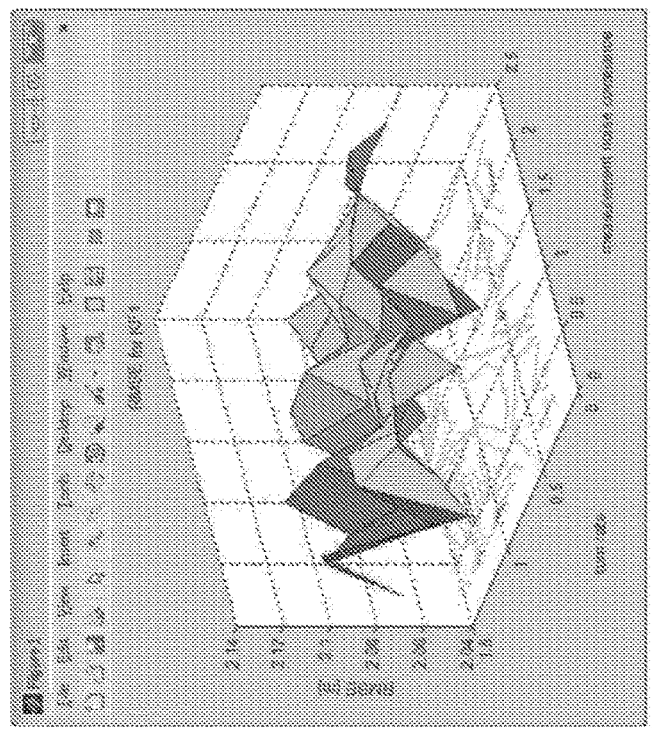
Figure 15D:
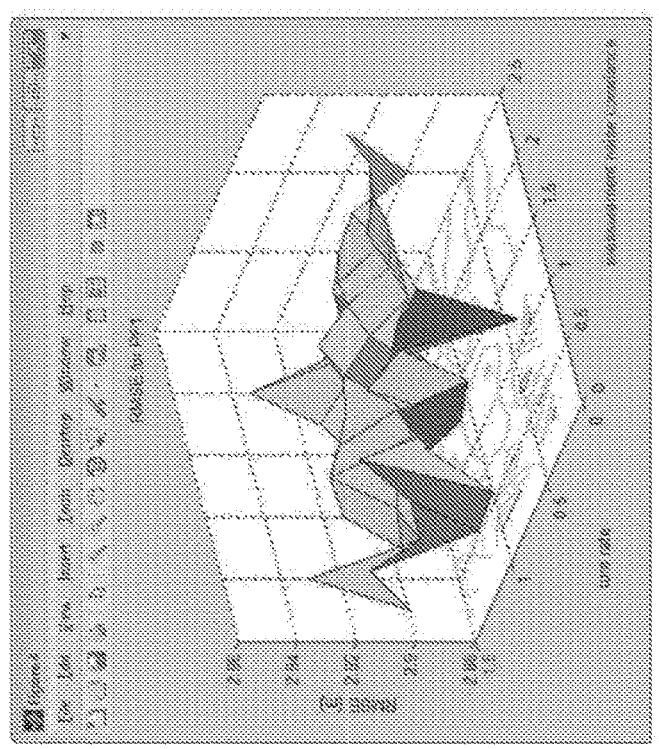
Figure 15C:
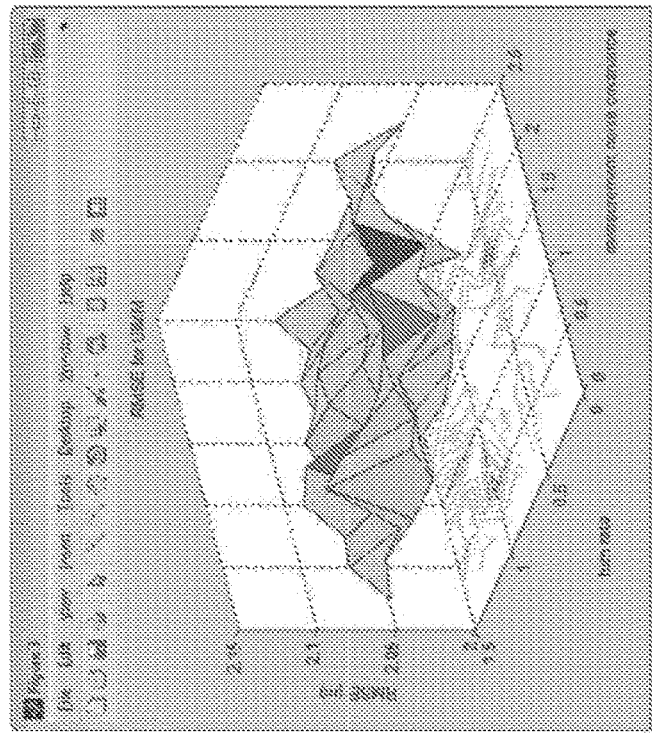
Figure 15E:
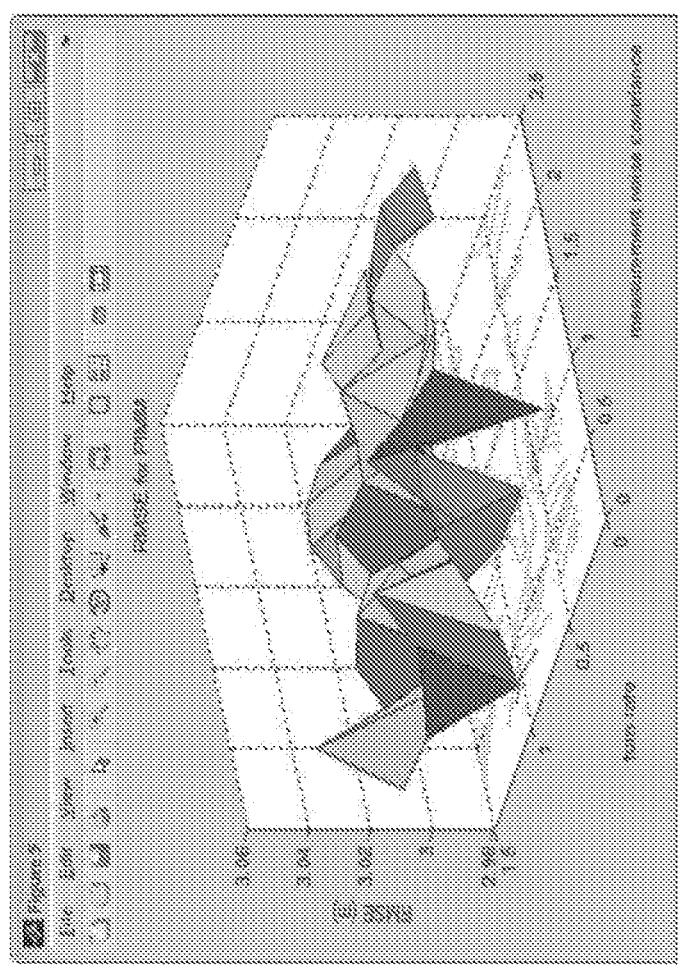

The tracking results of each filter in a sample individual run are plotted in FIGS. 14A through 14F. More particularly FIG. 14A plots KF1, FIG. 14B plots EIMM, FIG. 14C plots UIMM, FIG. 14D plots PF1, FIG. 14E plots PIMM. FIG. 14F represents a plot of tracking filter comparison for mixed mode trajectory. For viewing, each plot only contains the data points indexed from 171 to 270. Note that data points indexed from 1-250 are in "constant velocity", and data points indexed from 251-400 are in "turn/maneuvering".

In order to study the effect of noise variance and the turning rate on the tracking filters' performance, additional runs for KF1, EIMM, UIMM, PF1, and PIMM2 are performed with a range of turn rate and measurement noises, where turn rate is tr=θ/dt as defined above. The range of turn rate covers from 0.25 to 1.5 at the increment of 0.25, and the range of measurement noise covariance covers from 0.25 to 2.5 at the increment of 0.25. Measurement data generation of 200 points is performed for each given turn rate and measurement value, which generates a total of 60 measurement data sets. The first 100 data points are generated using the constant velocity model, and the second 100 data points are generated using the turn model. Each filter, KF1, EIMM, UIMM, PF1, and PIMM, runs on each measurement data set. As a result, there are 60 RMSEs calculated for each filter.

The RMSEs for each filter are plotted in FIGS. 15A through 15E. Each surface in FIGS. 15A through 15E is the 3D plot for a tracking filter. The x and y direction represents range of measurement noise and turn rate. The z direction represents the RMSE for a tracking filter.

Although the particle filters show the best performance in FIGS. 14A through 14E, it is observed that the RMSE values of EIMM and UIMM appear to be less affected by the change of turn rate and measurement noise than that of KF1, PF1, and PIMM. Note that the results in FIGS. 14A through 14E are obtained using a measurement data set of 400 data points, while the results in FIGS. 15A through 15E are obtained using measurement data sets of 200 data points due to computation time.

One skilled in the art recognizes that tracking filter selections may be achieved, based on the disclosure herein, in accordance with individual system variables and data availability without undue experimentation. Additionally, it is respectfully submitted that there are other variations to the present embodiments that, though not explicitly referenced, are considered to be within the skill of the art and therefor contemplated by and included within the present specification.

We claim:

1. A process for identifying and tracking maritime vessel contacts by an autonomous maritime vehicle for use in autonomous navigation of the autonomous vehicle comprising:
   receiving multiple sensor data sets from multiple sensors associated with the autonomous maritime vehicle and fusing the sensor data by the data fusion architecture to determine a state of the current operating environment of the autonomous maritime vehicle, wherein a state of the current operating environment includes identification of one or more maritime vessel contacts and one or more tracks thereof within the operating environment by application of a Multi-Hypothesis Tracking (MHT) algorithm to the multiple sensor data sets; and
   processing results of the application of the MHT algorithm to the fused sensor data from the data fusion architecture including assessment of an operational state of one or more sensed maritime vessel contacts, computation of maritime vessel contact density within the current operating environment and generation of one or more collision alerts and using the processed results to navigate the autonomous maritime vehicle, wherein navigation includes directing the autonomous vehicle to perform one or more of the following actions turn, change speed, and avoid an obstacle.

2. The process according to claim 1, wherein the data fusion architecture includes multiple processing modules implemented on one or more processors located on the autonomous vehicle, the multiple processing modules comprising: a sensor processing module, a track processing module and a behavior processing module.

3. The process according to claim 1, wherein the one or more of the following actions is compliant with the International Regulations for Prevention of Collisions at Sea (COLREGS).

4. The process according to claim 1, wherein the MHT algorithm performs at least the following steps on each of the multiple sensor data sets, wherein the multiple sensor data sets contain maritime vessel contact data, including measurements data related thereto:
   grouping measurements data and maritime vessel contact data into independently computable clusters, wherein measurements data and maritime vessel contact data is grouped in a same computable cluster when the measurements data and maritime vessel contact data fall within a predetermined local area;
   generating one or more new local hypotheses based on any previously-known maritime vessel contact data and the measurements data, wherein each of the one or more new local hypotheses is an association between a single maritime vessel contact, a single measurement data or both a single maritime vessel contact and a single measurement data;
   selecting most likely local hypotheses sets from a list of all local hypotheses, including the one or more new local hypotheses, wherein each selected most likely set of local hypotheses is a new cluster hypothesis;
   generating a list of all cluster hypotheses, including the new cluster hypothesis;
   selecting the most likely cluster hypotheses sets from the list of all cluster hypotheses;
   generating a global hypothesis set from the selected most likely cluster hypotheses sets, wherein the generated global hypothesis set is formed from by the combinations of selecting one cluster hypothesis from each of the most likely cluster hypotheses sets, and further wherein each selected cluster hypothesis includes a hypothesis tree;
   reducing a number of branches of each hypothesis tree of the proposed global hypotheses by eliminating unlikely hypotheses of the hypothesis tree;
   predicting one or more maritime vessel contact positions; and
   selecting a most likely global hypothesis for a given time, wherein the most likely global hypothesis is indicative of one or more predicted tracks for each maritime vessel contact.

5. The process according to claim 4, wherein a local hypothesis is selected from the group consisting of:
   an association between an existing maritime vessel contact and new measurement;

measurement is a new maritime vessel contact;
measurement is a false alarm;
maritime vessel contact is occluded; and
maritime vessel contact is gone.

6. The process according to claim 4, further comprising:
assessing by the data fusion architecture an operational state of one or more sensed maritime vessel contacts and in accordance with assessments:
automatically initiating tracks for newly sensed maritime vessel contacts;
automatically terminating tracks for previously sensed maritime vessel contacts that have not been seen for a predetermined amount of time; and
allowing for one or more measurements to be rejected as a false alarm.

7. The process according to claim 6, wherein the assessing includes application of one or more tracking filters to measurements data associated with the one or more sensed maritime vessel contacts, the tracking filters being selected from the following groups of filter Kalman Filters, Interacting Multiple Model Filters and Particle Filters.

8. The process according to claim 6, wherein the data fusion architecture is further programmed to recognize when the measurements data associated with the one or more sensed maritime vessel contacts indicates multiple tracks for a single maritime vessel contact and combines the multiple tracks to a single track for the single maritime vessel contact.

9. An autonomous navigation system for directing an autonomous maritime vehicle, the system comprising:
multiple sensors located on the autonomous maritime vehicle;
a sensor data fusion architecture including a sensor processing module and a track processing module;
wherein the sensor processing module receives data inputs from the multiple sensors, the data inputs providing information relevant to identification of maritime vessels within an operational range of the autonomous maritime vehicle and useful for determining a predicted track of each of the identified maritime vessels by a Multi-Hypothesis Tracking (MHT) algorithm of the track processing module;
wherein the track processing module includes one or more tracking filters selected from the following group consisting of Kalman Filters, Interacting Multiple Model Filters and Particle Filters; and
further wherein the track processing module is programmed to recognize when the information from the data inputs associated with the identified maritime vessels indicates multiple tracks for a single identified maritime vessel and combines the multiple tracks to a single predicted track for the single identified maritime vessel.

10. The autonomous navigation system of claim 9, wherein the multiple sensors include topside and underwater external sensors located on the autonomous maritime vehicle.

11. The autonomous navigation system of claim 9, including an autonomy decision engine for receiving the predicted track data and responsive thereto directing the autonomous maritime vehicle to perform one or more of the following actions selected from the group consisting of at least one of turning, speed changed, and obstacle avoidance.

12. The autonomous navigation system of claim 11, wherein the directed action is compliant with the International Regulations for Prevention of Collisions at Sea (COLREGS).

* * * * *